US012125322B2

(12) United States Patent
Arena

(10) Patent No.: US 12,125,322 B2
(45) Date of Patent: Oct. 22, 2024

(54) PORTABLE ELECTRONIC WIRELESS LOCK AND LOCK SYSTEM FOR EFFICIENTLY MANAGING AND ASSURING THE SAFETY, QUALITY AND SECURITY OF GOODS STORED WITHIN A TRUCK, TRACTOR OR TRAILER TRANSPORTED VIA A ROADWAY

(71) Applicant: David Arena, Hammonton, NJ (US)

(72) Inventor: David Arena, Hammonton, NJ (US)

( * ) Notice: Subject to any disclaimer, the term of this patent is extended or adjusted under 35 U.S.C. 154(b) by 0 days.

(21) Appl. No.: 18/509,405

(22) Filed: Nov. 15, 2023

(65) Prior Publication Data

US 2024/0194001 A1 Jun. 13, 2024

Related U.S. Application Data

(63) Continuation of application No. 17/074,119, filed on Oct. 19, 2020, now Pat. No. 11,837,034, and a continuation of application No. 16/991,852, filed on Aug. 12, 2020, now Pat. No. 11,854,312.

(51) Int. Cl.
*G07C 5/00* (2006.01)
*G07C 9/00* (2020.01)

(52) U.S. Cl.
CPC ......... *G07C 5/008* (2013.01); *G07C 9/00896* (2013.01); *G07C 2009/00769* (2013.01); *G07C 2009/0092* (2013.01); *G07C 2209/08* (2013.01)

(58) Field of Classification Search
CPC ................ G07C 5/008; G07C 9/00896; G07C 2009/00769; G07C 2009/0092; G07C 2209/08
See application file for complete search history.

(56) References Cited

U.S. PATENT DOCUMENTS

2009/0125425 A1* 5/2009 Kloostra ............ G06Q 10/0875 705/29
2015/0012445 A1* 1/2015 Reid ...................... G06Q 10/20 705/305
2016/0019497 A1* 1/2016 Carvajal ................ G01C 21/34 705/333

* cited by examiner

*Primary Examiner* — Omeed Alizada
(74) *Attorney, Agent, or Firm* — Olivo IP Law Group, P.C.; John W. Olivo, Jr.

(57) ABSTRACT

A portable electronic wireless lock and lock system for ensuring the safety of goods, including humanly consumable goods. The lock and lock system are controlled by a smartphone, which also acts as a communications hub between the lock and a truckload owner or supervisor. According to the present invention, a truck driver uses a smartphone to interface between a trailer payload supervisor and the payload lock itself, to ensure the safety of the transported goods and comply with regulations such as the Food Safety Modernization Act ("FSMA"). An electronic lock and lock system may, according to the present invention, interface electronically to a smartphone, so that while in motion, the smartphone ensures that the lock remains locked and controls its operation. Alternatively, such an electronic lock may be designed to permit only a limited number of locking cycles initiated by a truck driver until a loading supervisor intercedes in compliance with FSMA.

15 Claims, 27 Drawing Sheets

PORTABLE ELECTRONIC WIRELESS LOCK AND LOCK SYSTEM FOR EFFICIENTLY MANAGING AND ASSURING THE SAFETY, QUALITY AND SECURITY OF GOODS STORED WITHIN A TRUCK, TRACTOR OR TRAILER TRANSPORTED VIA A ROADWAY

PRIORITY CLAIMS

This application is a continuation of U.S. patent application Ser. No. 17/074,119, filed Oct. 19, 2020, which is a continuation-in-part of U.S. patent application Ser. No. 16/991,852, filed on Aug. 12, 2020, which is a continuation of U.S. patent application Ser. No. 16/171,183, filed on Oct. 25, 2018, and issued as U.S. Pat. No. 10,777,026 on Sep. 15, 2020, which is a continuation of U.S. patent application Ser. No. 15/680,144, filed on Aug. 17, 2017, and issued as U.S. Pat. No. 10,134,205 on Nov. 20, 2018, which claims the benefit of U.S. Provisional Patent Application No. 62/376,865, filed Aug. 18, 2016, the contents of which are incorporated herein by reference. This application is a continuation of U.S. patent application Ser. No. 16/991,852, filed on Aug. 12, 2020, which is a continuation of U.S. patent application Ser. No. 16/171,183, filed on Oct. 25, 2018, which is a continuation of U.S. patent application Ser. No. 15/680,144, filed on Aug. 17, 2017, and issued as U.S. Pat. No. 10,134,205 on Nov. 20, 2018, which claims the benefit of U.S. Provisional Patent Application No. 62/376,865, filed Aug. 18, 2016, the contents of which are incorporated herein by reference.

BACKGROUND OF THE INVENTION

Extensive systems have been deployed to use Global Positioning System ("GPS") capabilities for the purpose of tracking vehicle fleets including truck trailers, truck tractors, and/or trucks, railcars, or fleets of cargo containers. Such systems have been referred to as "asset tracking systems" and deploy asset-tracking units designed to be attached to individual vehicles. Each asset-tracking unit typically includes a GPS receiver that is capable of receiving GPS signals from a plurality of GPS satellites, thereby determining the unit's location based on the GPS signals. Upon obtaining a position fix, the asset tracking unit may report the unit's location via satellite communication (using another set of satellites) to a central station. With such a system, the proprietor of the vehicle fleet may have close to real-time information concerning the whereabouts of all vehicles in the fleet. This may lead to significant efficiencies in planning and managing assignments of vehicles to particular tasks.

In addition, an asset tracking system of this type may help in the detection of, and response to, irregularities such as theft of vehicles or their contents. It has been proposed to install one or more sensors in or on a vehicle with the sensor(s) interfaced to the asset-tracking unit assigned to the vehicle. The sensor(s) may detect changes in conditions related to the vehicle, such as opening or closing of a door of a vehicle, loading or unloading of cargo in or from the vehicle and (where the vehicle is a truck trailer) coupling or de-coupling of the vehicle to or from a truck tractor. The sensor(s) may provide signals indicative of such events to the asset-tracking unit, which may then report the events to the central station to increase the amount of information about the operation of the vehicle that is present in the asset tracking system. In at least some cases, the system may notify a user/attendant of the events, and the user/attendant may take steps to respond to the events.

Potential disadvantages of reporting and responding to events in an asset tracking system may involve an expenditure of resources such as battery power capacity of the asset tracking units, use of satellite communication systems and charges for such use, and attendant time and attention for receiving reports of events and/or responding to such reports.

Cargo theft in the United States has reached gigantic proportions. A disturbing number of those thefts (40% by some estimates) involve driver and warehouse personnel complicity. Trailer theft by deception is not uncommon. Fraudulent authorization papers presented to security by a driver will allow that driver to depart the facility with a stolen trailer.

Many facilities are closed when trucks arrive, and drivers are dependent on prior dispatch information to accurately drop and hook trailers. Information received by a driver from dispatch prior to arrival at a facility is rendered inaccurate if changes have been made at the designated facility and the driver is unaware of these changes. At large busy facilities traffic control generally does not always have an accurate account of the disposition of trailers, dock doors or parking space that is already occupied. It is common practice at facilities for security to instruct an incoming truck to park the trailer in a designated parking area without assigning a parking space number to the driver. Security and traffic control are dependent on the driver to inform them of parking space location of parked trailers and the parking space location from which a trailer is retrieved for departure from the facility.

It is not uncommon at large facilities for traffic control to dispatch a yard tug driver to go and "find" a particular trailer and report its location back to traffic control. Crowded, disorganized parking of trailers at parking areas within the facility is commonplace. Equipment and property are damaged by drivers in the process of parking and retrieving trailers at these areas.

Security at some facilities is non-existent. At other facilities, security consists of a security guard making rounds of the property at regular intervals. However, a security guard cannot be in all places at all times. Other measures of security presently employed include cameras and seals or locks on trailer doors, but cameras are easily rendered inoperable, and seals and locks can be cut with bolt cutters or a hacksaw.

Satellite communication is employed in specific areas of truck operations and is primarily a tracking system that 'observes' from space. However, satellite tracking, while useful in some areas of the industry, is susceptible to atmospheric and technical interference. It also does not address the continuous multiple tracking, loading/unloading, parking, damage control and security problems presently existing at large busy facilities. In addition, the effectiveness of the satellite tracking system is dependent on an attachment to the trailer to accommodate satellite tracking signal, and any attachment to a trailer is vulnerable to vandalism, theft or deactivation.

While some large facilities do have computerized tracking systems in place, they are simply that—tracking systems for containers within that particular facility. None are integrated into a security line, which alerts security and other authorities when a breach of security takes place.

More recently, the US Food & Drug Administration has enacted the Food Safety Modernization Act. The FDA Food Safety Modernization Act (FSMA) rule on Sanitary Transportation of Human and Animal Food is now final, advancing FDA's efforts to protect foods from farm to table by keeping them safe from contamination during transportation. FSMA has seven foundational rules proposed since January 2013 to create a modern, risk-based framework for food safety. The goal of this rule is to prevent practices during transportation that create food safety risks, such as failure to properly refrigerate food, inadequate cleaning of vehicles between loads, and failure to properly protect food, from farm to fork, so to speak.

The rule builds on the safeguards envisioned in the 2005 Sanitary Food Transportation Act (SFTA). Because of illness outbreaks resulting from human and animal food contaminated during transportation, and incidents and reports of unsanitary transportation practices, there have long been concerns about the need for regulations to ensure that foods are being transported in a safe manner.

The rule establishes requirements for shippers, loaders, carriers by motor or rail vehicle, and receivers involved in transporting human and animal food to use sanitary practices to ensure the safety of that food. The requirements do not apply to transportation by ship or air because of limitations in the law.

Specifically, the FSMA rule establishes requirements for vehicles and transportation equipment, transportation operations, records, training and waivers. With some exceptions, the final rule applies to shippers, receivers, loaders and carriers who transport food in the United States by motor or rail vehicle, whether or not the food is offered for or enters interstate commerce. It also applies to persons, e.g., shippers, in other countries who ship food to the United States directly by motor or rail vehicle (from Canada or Mexico), or by ship or air, and arrange for the transfer of the intact container onto a motor or rail vehicle for transportation within the U.S., if that food will be consumed or distributed in the United States. The rule does not apply to exporters who ship food through the United States (for example, from Canada to Mexico) by motor or rail vehicle if the food does not enter U.S. distribution. Companies involved in the transportation of food intended for export are covered by the rule until the shipment reaches a port or U.S. border.

Specifically, the rule would establish requirements for: (1) vehicles and transportation equipment: The design and maintenance of vehicles and transportation equipment to ensure that it does not cause the food that it transports to become unsafe. For example, they must be suitable and adequately cleanable for their intended use and capable of maintaining temperatures necessary for the safe transport of food; (2) transportation operations: The measures taken during transportation to ensure food safety, such as adequate temperature controls, preventing contamination of ready to eat food from touching raw food, protection of food from contamination by non-food items in the same load or previous load, and protection of food from cross-contact, i.e., the unintentional incorporation of a food allergen; (3) Training: Training of carrier personnel in sanitary transportation practices and documentation of the training. This training is required when the carrier and shipper agree that the carrier is responsible for sanitary conditions during transport; and (4) records: Maintenance of records of written procedures, agreements, and training (required of carriers). The required retention time for these records depends on the type of record and when the covered activity occurred but does not exceed 12 months.

The result of FSMA is that the largest food distribution systems will be compelled to add a monitoring and safety cost to their transportation and logistics operations. However, the smaller entities will be presented with these increases as well. While FSMA purports to lessen the burden on the smaller operators, it does not go far enough. In reality, the small food operators (e.g., the "family farmer") will find it next to impossible to comply with FSMA in a meaningful way, being compliant, yet in a cost-effective manner.

As a result, there are several significant issues with the prior art. First, many systems rely on sensors that are permanently mounted to cargo containers or truck trailers. Fixed devices can become obsolete, and small time operators may find their subscription cost and updating to be cost prohibitive. Next, fixed sensors need to communicate with the outside world, so many are equipped with satellite transponders or cell phone or wireless interfaces. Again, this approach is very costly. Next, software that links trucks with truck operators and ties in purchase orders or manifest reports is often "enterprise" in nature, and therefore often cost prohibitive for small operators or inefficient even for larger operators. In addition, when the payload is of relatively low value, such as a regular crop yield, high cost fixed sensors, satellite communications enterprise software adds too much cost; yet, the problem is that even a routine crop like lettuce, while not itself valuable, needs to be safeguarded against food contamination, bioterrorism and other threats to the food supply.

In other words, the crop value isn't as critical as the potential damage a contaminated crop may cause in the food chain. Very few of the prior art systems use the smartphone of a truck driver, and those that do lack the sophistication to ensure food safety or cargo security from point to point with the ability to ensure that even between various drivers and intermodal transit, a cargo load, once locked, is secure against damage and tampering.

The prior art completely neglects to link the now commonplace personal driver smartphone with the outside world, including cargo sensors, locks, electronic Bluetooth locks, cargo monitoring software, scheduling software, purchase order and inventory management software, farming or agricultural production software and point of delivery warehouse tracking software or even end point grocery store inventory management software. The prior art does not teach compliance with the Food Safety and Modernization Act through the use of a personally owned driver smartphone as the communications hub and lock verification mechanism.

Yard management, fleet management, mobile dispatch and delivery, cross-docking, terminal and distribution center operations, shipping and railway operations, GPS, telemetry, remote management and RFID solutions quickly add cost to operations. Most institutional transport companies are reluctant to rely on personal smartphones for fear of a security breach. However, with respect to FSMA compliance, which has been extended to even the smallest of operators, relying on the generally present driver smartphone saves significant expenses. If a driver does not have a capable smartphone (with a camera, Bluetooth interface, and a carrier connection), a transportation network may decide to drop that driver or provide a driver with a rented smartphone for transport usage, much the same way some cab companies operate for transporting people.

Finally, mechanical seals (plastic or metallic) do not provide real time monitored solutions to the problem at hand. Most tractor trailers are equipped with locking hardware, usually requiring the use of a padlock. Typically, the padlock is manual and requires the use of a physical key. However, many leading lock manufacturers such as Master Lock and Medeco (Assa Abloy) now manufacture sophisticated electronic wireless locks, controllable via smartphone.

One missing link between these systems is the necessity of the electronic lock being able to communicate with existing payload safety and security systems, and transmit data to trailer load owners or supervisors on an efficient basis without the need for expensive enterprise software.

In particular, U.S. Pat. No. 8,453,481 to Master Lock discloses an electromechanical lock controlled by electronic means, and U.S. Pat. No. 9,109,379 discloses a padlock controlled by a smartphone. In all cases, the mechanical interface to electronic control mechanisms are disclosed, but not tied to the requirements of the Food Safety Modernization Act, or FSMA.

Under FSMA, once a payload of food is loaded into a trailer, it must be secured and access limited until it reaches its intended endpoint. Consequently, prior art systems lack a supervisory level of lock monitoring and control, whereby the monitoring and control are carried out the most efficient way possible. What is missing is a system whereby the communications hub is the typical truck driver smartphone, with its ability to access the internet, the cloud, GPS coordinates and cell phone towers.

In addition, what is missing is that the truck driver's smartphone accesses precise time of day and day of year data, and is usually Bluetooth compatible, so it could monitor and control appliances associated with FSMA compliance. Yet, no system has utilized these building blocks in this manner. Moreover, portable electronic wireless locks lack the ability to be programmed and then encrypted for a set number of "lock" and "unlock" operations, based on frequency, time of day, GPS position, or other authorization codes associated with the payload itself or its supervisor.

Electronic lock manufacturers have not provided for a simple FSMA compliant electronic lock, where the firmware and software are embedded within the lock itself (rechargeable or by battery operation) so that a lock may be "set" to permit just one "lock" and then one "unlock". The payload supervisor or owner would have to override the setting so that a truck driver can comply with FSMA, whereby loads must be essentially locked and secured from "farm to fork", or at least from "farm" to warehouse or warehouse to warehouse or warehouse to retail outlet, etc.

SUMMARY OF THE INVENTION

According to the present invention, trailers and tractors need not be modified in order to be compliant with FSMA. The leading manufacturers of trailers include Utility, Great Dane, Xtra and others. Many trailer manufacturers are offering equipment upgrades in order to meet FSMA requirements, yet, trailers have a long time useful life. In other words, as trailers are replaced it is somewhat feasible to buy new ones equipped with FSMA compliant telemetry equipment, but even then, the trailer operators are then presented with a high monthly charge for monitoring.

The key feature of the present invention is that most if not all truck drivers carry smartphones, equipped with Bluetooth, Near Field Communication ("NFC"), GPS and other common interface protocols. Now, the truck driver's smartphone conveniently serves as a hub for the present invention. Next, FSMA is concerned with food protection from farm to fork. Once a trailer is loaded with food, temperature and access become critical factors. Consequently, according to the present invention, an enhanced Trailer Monitoring Device (TMD) that uses Bluetooth (short or long range, as applicable) or NFC to communicate sensor data to the smartphone of a truck driver.

The use of a central monitoring system that aggregates and analyses all data collected from the various components of the overall system serves as a backup or secondary information source when either the driver or client require assistance or information verification. The central monitoring system is able to collect, organize and monitor all data collected from various sensors and mobile application user input. Preventing, actively monitoring and resolving transportation issues with the central system administrator increases overall transportation efficiency and operation. All data is securely stored in transportation logs that can be accessed by the client to achieve compliance for current FSMA regulations.

All incidents pertaining to equipment or property damage are immediately communicated to the central monitoring system, whereby data is analyzed by administrative personnel and action is taken to aid the driver in resolving the situation. All data and subsequent communication is then stored on a secure server and the client has access to the full vehicle data logs and incident reports. The central security system administrators primarily serve as a data communication bridge between the client, the driver and the broker, as well as notifying emergency services if necessary. Data collected by the central monitoring system can be transported via cellular signal and Wi-Fi signal where available.

The TMD may include one or more of the following sensors: temperature, shock, elevation, light presence, a camera or video monitor, a microphone or noise detector, an ultrasonic motion detector, an infrared image detector, recording means for any of the above and a portable means of power supply, either long term battery or a rechargeable battery supply. According to the present invention, the TMD may have a fastener mechanism for holding it to the interior wall, floor or ceiling of the interior of a closed trailer. For example, if the walls of the trailer are magnetic, a magnet may be used or industrial strength Velcro, for example.

Advantageously, according to the present invention, the TMD's are completely portable and are not pre-disposed to be associated with any particular trailer, tractor, driver or padlock. Each TMD has a unique embedded electronic serial number (ESN) so that it may be used for any load, by any driver, with any tractor, for any destination or cargo type or style.

The TMD's may be supplied in rechargeable pairs or groups so that they are configured for multi-segment trips. In that manner, a series of TMD's may be associated with a particular broker, carrier or company. If a pair becomes redundant, one TMD may be recharging while another is operational inside a trailer, locked for the duration of a transportation segment. The TMD may be equipped with a battery life sensor so that the data stream output is readable by monitoring equipment and battery life may be optimized and monitored.

The TMD may be redundant but is intended to be a universally transportable device. Importantly, the "hub" of data operations is, according to the present invention, the smartphone owned or under the control of the truck driver. The TMD is locked within the trailer or the cargo container so that the TMD travels with the load that must be protected under FSMA guidelines. It is intended that a TMD stays with its payload until the payload reaches its final destination. Accordingly, the TMD is designed to consume a minimal amount of power. For example, the TMD will generally not, according to the present invention, include GPS or geolocation circuitry, and will not include warning indicators like sirens or flashing lights.

In addition, it is intended that the TMD transmits encrypted data only, except that it may receive configuration data from a driver's smartphone. In turn, a driver's smartphone may use the public cellular network to allow for control signals to be passed to and status signals to be read from a TMD. Accordingly, with the present invention, it is not anticipated that a TMD will have its own internal cellular interface, but rather, will rely on the driver's smartphone for operation.

The TMD may be temperature proof and waterproof and made to be durable so that it may be used over and over again, and travel with any payload. Importantly, a TMD may be fitted to include many more sensors that are activated in connection with any given payload transport operation. For example, if a payload is a collection of precious stones, the FSMA characteristics of the TMD may be turned off, such as temperature sensing. However, the infrared sensing and video monitoring functions activated, by way of status and control signals passed to the TMD from a cloud-based control system, tethered to the TMD by way of a driver's smartphone.

The subscription plan selected by the payload transport company or the payload owner or insurer will reflect what is being transported and its cost of transport. In turn, payload transporters or owners or even brokers may decide that certain loads are more valuable than other loads or that certain criteria need to be monitored by a TMD more closely than others.

Therefore, the cloud-based system will enable payload transporters or owners to activate the correct array of sensors within the TMD, and pay for those sensing operations to be performed by the TMD on a per time unit basis, per mile and based on the criteria that are desired to be monitored. As a result, continuous "in the dark" video surveillance by a TMD may cost a lot more than temperature monitoring for FSMA purposes.

According to the present invention, the TMD may be a unit which is handheld, and one or several of them may be deployed within a given container, such as a locked trailer containing fruit and vegetables, precious cargo, or even hazardous waste products. Deploying TMD's within said space is similar to stationary fixed spaces that are monitored by the well-developed security industry. What distinguishes the present invention is that the TMDs are universal in their construction. For FSMA compliance purposes, the TMDs simply "watch" to make sure that the rear door of a trailer has not been opened, and that temperature is maintained. The TMD will lack the ability to interpret its own data, mainly because it is dependent on the driver's smartphone, which aside from advantageous native code (iOS or Android), is dependent to the overall Monitoring Control System, or MCS.

A driver's smartphone is the central hub according to the present invention. It will need to have a camera, a GPS unit, and a cellular interface. According to the present invention, a significant amount of savings can result from FSMA compliance because it is recognized that in the present day, most truck drivers have relatively modern smartphones. That is the key aspect of the present invention, whereby at the lowest value of cargo for FSMA compliance, a TMD will be very basic and all GPS and network connectivity is achieved for free by the transporters, farmers, brokers and grocery store chains and their warehouses. In other words, when a load is hazardous waste material or precious stones, security costs are overlooked. However, when the cargo amounts to lettuce, the margins are tight. Paying for high-cost monitoring becomes impractical from a cost accounting perspective. But, protecting the general public from farm to fork is a primary aspect to FSMA.

Accordingly, the utilization of what is already available becomes critically important. Therefore, according to the present invention, a TMD interfaces with a driver's owned or controlled smartphone and that in that manner, the cargo's adherence with FSMA guidelines is assured. Conversely, if a farmer or transport company is forced to purchase new trailers with TMD's build into the trailer, it may become obsolete, cost too much and not scale in proportion to what is being transported, monitored and protected.

According to the present invention, the driver's smartphone must preferably contain a built-in camera, and possess a Bluetooth or NFC type interface to link with the TMD to enable it to photograph or image the back of the trailer to visually confirm that the trailer is securely locked. All trailers have identification indicia on them, such as driver licenses, permit numbers, DOT numbers and so forth.

According to the present invention, once a cargo load is placed within a trailer, the rear doors are closed and locked. FSMA guidelines require that food cargo remains locked during transport to ensure non-tampering by those who would wish to do harm to the general public, e.g., bioterrorism. According to the present invention, a driver locks the back doors to the trailer, and then snaps an image of the back door with its lock, showing the lock is locked and that a certain lock is attached and has been attached to a particular trailer, with its visible indicia. At that point, according to the present invention, that image is made part of the data and collected by the MCS. So that at the moment a driver "locks the payload", the MCS is aware of the electronic serial number of the driver's smartphone, its GPS location, and has an image of the back of the securely locked trailer, and knowing exactly what was loaded into the trailer, based on purchase orders and bills of lading as to each individual load. The time of day and date are known, as is the driver's identity. Position may be tracked, and the TMD is also providing status signals to the driver's smartphone, which are in turn transmitted to the MCS.

According to the present invention, a new generation of so-called Bluetooth locks may be employed. Typical lock companies such as Masterlock and Medeco provide Bluetooth locks, which may open and close with a physical key, or be locked and unlocked (opened and closed) by way of Bluetooth signals from a dedicated software application. According to the present invention, Bluetooth locks may be adapted and may, in turn, be controlled by a software application running on a driver's smartphone, so that the MCS may have the benefit of the lock's real time status. By way of an automated lock, the MCS may even take control of when a lock is unlocked. Therefore, the MCS controller or supervisor may dictate when a lock may be locked and unlocked, ensuring complete safety and security from farm to fork.

According to the present invention, an application that can be accessed through a driver's mobile device has the ability to control, monitor and log data related to the transportation conditions and status of the lock during the transportation of an asset in real time. The driver is able to access status updates and system device control through a secure application user interface. The driver application user interface can verify, enable or disable trailer lock functionality. The application user interface can also be configured to allow system control capability to authorized users such as the client or asset transportation coordinator. A system log of all activity between the locking device, trailer monitor and driver application is stored on a secure server for reference and FSMA compliance protocol.

Minimization of the cost is a primary aspect of the present invention. Locks may also be supplied in redundant pairs and rechargeable so that a driver may always have one ready to securely lock a load. So for low-cost FSMA compliance, a driver may have two simple TMD's with two simple electronic locks, and a charging base so that a driver's smartphone can be used to replace much of the traditional costly surveillance equipment associated with trailer safety or FSMA compliance. As new FSMA guidelines are implemented and begin to apply more to smaller family farmers, a low-cost FSMA compliance solution becomes necessary and is provided according to the present invention.

A primary aspect of the present invention is that all phases of freight transit may be monitored, including load tenders, pickup, transit, and delivery. While each handoff could present a risk, the present invention builds an electronic certificate that is a chronology of the load from when it is inserted and locked into a trailer until it is unlocked at a destination, often a warehouse. These steps may apply to highway transportation, rails, sea or via air. In all cases, when a load is received and locked, a supervisor (generally a truck driver) "locks" the load. At the time of locking, the driver will use a smartphone to snap a picture of a padlock as it has secured the rear door of a trailer. The padlock may be a manual padlock or an electronic lock, for example, the lock is Bluetooth enabled and is able to interface directly to the smartphone or hub.

When the driver snaps the image of the lock, hash marks in the viewfinder or smartphone video display may shoe a region to place the license plate number or other surface identification indicia on the trailer itself. Accordingly, upon snapping the locking picture, the driver has recorded a time, place (GPS), container number and lock (with or without a serial number or electronic serial number), and a remote database entry is created and stored in reference to the precise start point and time for securing that load.

Accordingly, a digital certificate is created which establishes that the load has been indeed locked and is secure. As an additional security measure, the internal monitor can sync up with the smartphone to verify that the load has not been tampered with. For example, infrared sensors, shock sensors, cameras, temperature sensors, gas chromatography, and so forth, may be portable and affixed to the inside of the trailer before it is closed and locked. Each of said sensors has unique electronic serial numbers, whereby those numbers are associated with a digital certificate. In that way, the remote database and the smartphone will create and then monitor the load status, security and position via GPS readings from the driver's smartphone as it travels between endpoints.

The remote database will store the digital certificate and track its position, status and safety parameters over time, correlating that data with all outstanding purchase orders, incoming and outgoing manifests and other available inventory management systems. Accordingly, a major cost reduction is achieved because the primary in-transit communications mechanism is that of a driver's personal smartphone; a primary location component is the GPS associated with a driver's personal smartphone; and the hub and visual record of the locked trailer is stored and then transmitted by way of the driver's personal smartphone. Accordingly, the digital certificate contains many data fields pertaining to the secured load and is unique to the actual load secured and under transit, and may be passed on from driver to driver until the load reaches the designated endpoint.

According to the present invention, an electronic lock may be used to lock a trailer, operating via a rechargeable battery cell or a long life lithium ion battery. A portable electronic lock with a wireless control channel such at Bluetooth may communicate with a truck driver's own personal smartphone. According to the present invention, well-known electronic locking mechanisms may be adapted so that driver's existing and personal smartphones run application software which has the ability to cause a lock to unlock when the truck reaches its intended destination. This is a crucial aspect in achieving FSMA compliance, specifically to ensure that once the load is securely locked by the driver, that load is locked for the full duration of transportation, until the load reaches its intended destination whereby the load is unlocked for the first time since pick-up. Supervisory control may be insured and if applicable, control can be passed from one supervisor to another. For example, a handoff from a farmer to a broker, broker to a supermarket warehouse, or warehouse to any other retail outlet, etc. The driver's smartphone may use a secure and encrypted Bluetooth communication channel so that an electronic lock may be both controlled and monitored at all times.

While the driver may be given specific lock and unlock codes, it will likely be the load supervisor or owner who will be responsible for locking and securing the load by a remote activation feature through the application. This releases the driver from FSMA compliance responsibility. In that manner, insurance premiums may be managed as a result of the increased security and assurance of food safety.

In one mode, a driver's smartphone generates a time of day and day of year code, a GPS code, and status data from an electronic padlock. The smartphone may then upload all of these signals to a cloud-based database whereby the load supervisor or load owner may track the exact location of the load in real time. Alternatively, the smartphone may be running software that stores, archives, and buffers said data so that a loading supervisor or owner can monitor the collected data at particular intervals, and subsequently issue control signals, such as "unlock" or remain "locked".

Alternatively, a lock itself may be programmed to only unlock one time in response to any smartphone command, whereby only the load supervisor or owner has encrypted instructions to program the electronic lock to permit unexpected locking cycles.

If a lock should lose communication with its host, the lock contains internal onboard memory (such as a Subscriber Identity Module (SIM) card) which controls the lock, and which ensures that an electronic serial number (ESN) is given "lock" and "unlock" protocol instructions as soon as the portable lock is applied to a particular load. In that manner, a load supervisor may take a lock according to the present invention and program the lock per load, so that a driver may own a smartphone, a pair of locks and a pair of interior cargo sensors (to monitor temperature, shock, motion, etc.). At the beginning of a trip, the load supervisor programs a driver's smartphone and lock combination, or pairing, with a set of instructions specifying that the lock may only be unlocked at a particular time and place, and under a precise set of conditions.

If a driver is to be permitted to unlock it anytime, such as in the case of inspection, the time, place and number of locking cycles are precisely monitored and stored both on the driver's smartphone and within the padlock according to the present invention itself.

Subsequently, these stored instructions and monitored conditions will be transmitted to the load supervisor or owner continuously or periodically dependent on cellular network or satellite service availability. Importantly, the buffering arrangement, according to the present invention, eliminates problems associated with limited cellular availability, so that FSMA compliance is not compromised due to service interruption.

The system, according to the present invention, remains fully operational and the driver's smartphone and the electronic lock have internal memory capability to continuously monitor and store data of the payload, pursuant to a set of instructions provided by the load supervisor or owner, from any point of transport. Also, accounting for time of day, day of year, mileage, GPS position, owner and operator criteria, alarm states from the monitor within the trailer, and of course, any permitted driver input, such as stopping for inspections (which is recorded and time and position stamped), and arrival at a predetermined destination at which time a lock cycle takes place and a load is passed in different points along the supply and transportation chain, in compliance with FSMA guidelines.

These and other features, embodiments, and aspects of the present invention can be appreciated from the following drawing description and detailed description of the preferred embodiment.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION OF THE PREFERRED EMBODIMENT

Figure 1:
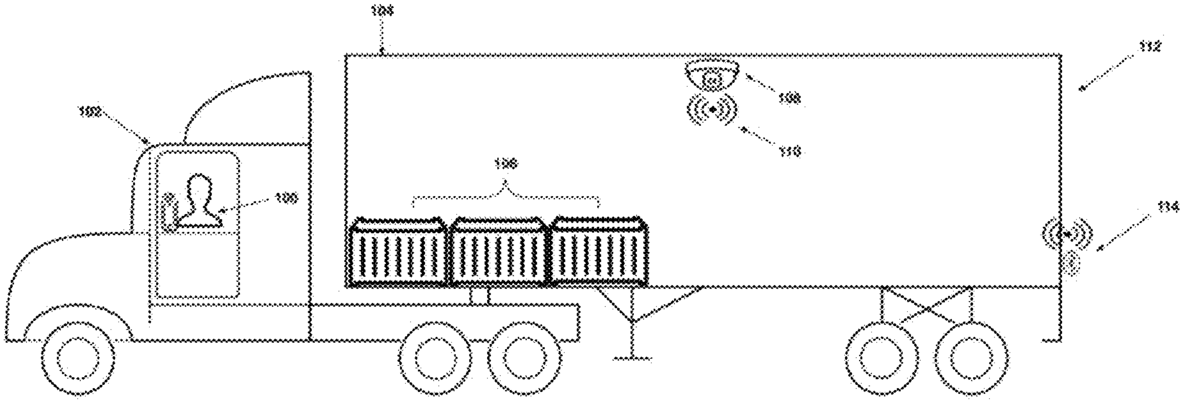
FIG. 1 is a side profile overview of the monitoring system components within a tractor trailer.

FIG. 1 is a side profile overview of the monitoring system components within a tractor trailer. In accordance with the preferred embodiment of the present invention, the overall monitoring system consists of 2 components, one paced inside the trailer and one placed outside on the rear door, that communicate with an application downloaded to the user's smartphone device 100, allowing the user to monitor the cargo and receive alerts if there are any changes detected by the other monitoring components. The user and the mobile device 100 are primarily located in the front tractor trailer 102. The user is responsible for transportation of the assets 106 located within the semitrailer 104 attached to the tractor trailer. The removable monitoring component 108 is placed within the semitrailer 104 in the most optimal position in order to act as a visual surveillance device within the semitrailer, as well as monitoring and transmitting the conditions inside the semitrailer, including but not limited to monitoring temperature, motion and light.

The monitoring component 108 communicates wirelessly 110 with the application on the user's mobile device 100. The monitoring component also communicates wirelessly with the electronic locking device 114 placed on the rear semitrailer door 112. The wireless communication 110 between the mobile application 100, the monitoring component 108, and the electronic lock 114 is transmitted through Bluetooth technology or a similar wireless device pairing technology. The electronic lock 114 transmits alerts and status updates when there are any changes detected, such as the lock being opened or compromised. The electronic lock 114 communicates with the monitoring component 108 to determine if there are status changes within the semitrailer, thereby sending alert and status update transmissions to the mobile application 100.

Figure 2:
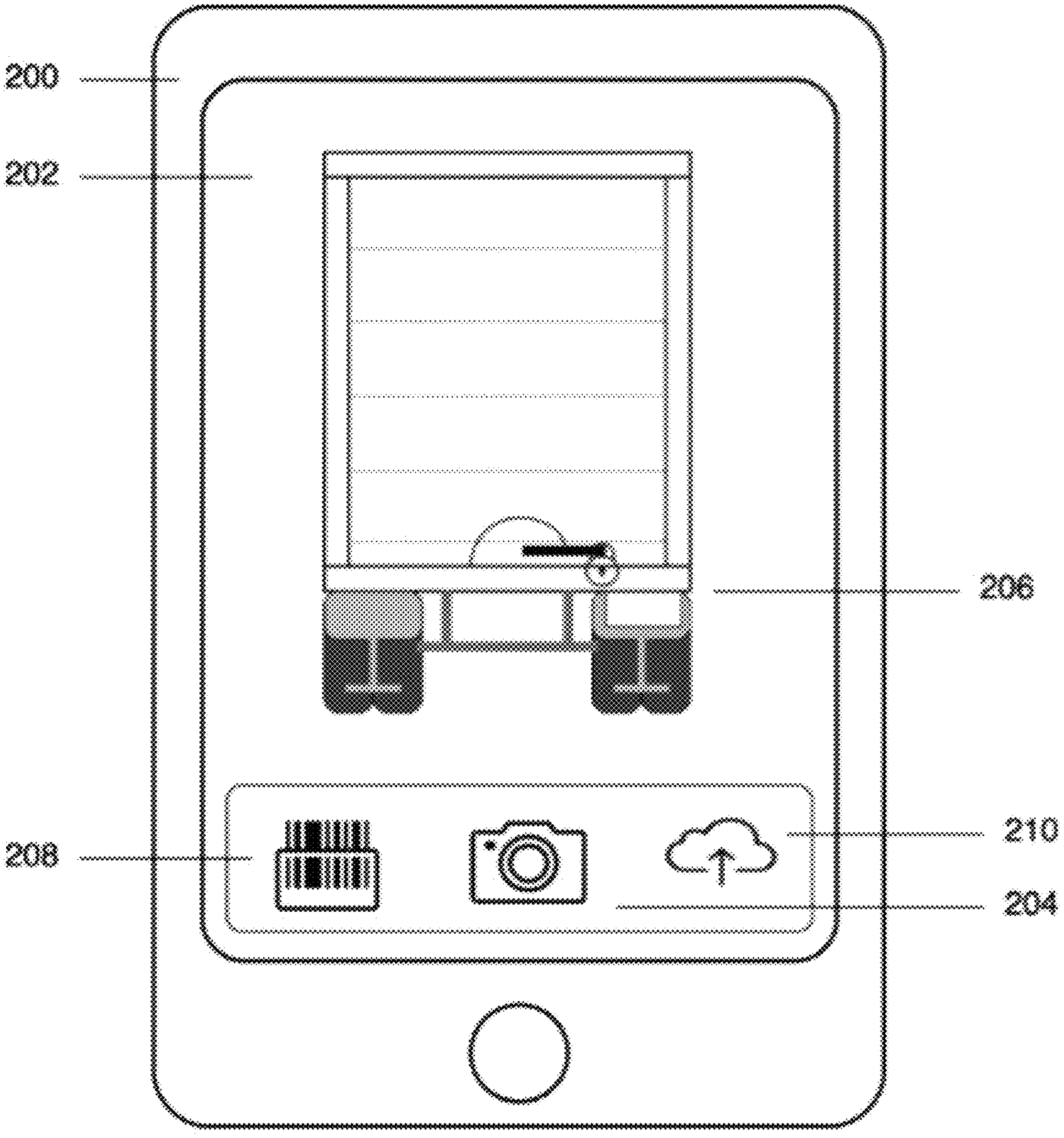
FIG. 2 depicts the rear door and locking mechanism of the tractor trailer monitoring system as shown on the application monitoring system photo verification module on a user's smartphone device.

FIG. 2 depicts the rear door and locking mechanism of the trailer monitoring system as shown on the application monitoring system photo verification module on a user's smartphone device. In accordance with the preferred embodiment of the present invention, the application on the user's mobile device acts as a data transmission and storage hub of all alerts and status updates transmitted from the monitoring component and electronic lock. One aspect of the present invention is a photo verification module that is integrated with the camera component of the mobile device 200. The user uses the application to take a photo 204 of the rear door of the semitrailer 202 to confirm that the door is locked with the electronic lock 206 and the assets are secure. The photo is stored with a date and time stamp as well as the geolocation data. The application stores this data on an external application server.

The application photo verification module also serves as a data scanning function 208, detecting, scanning and storing the license plate information and other key identification data including but not limited to the trailer ID number, identification barcode or other readable code such as a Quick Response ("QR") code. The photo data, date, time, location and scanned items are stored on a secure external application server 210.

Figure 3:
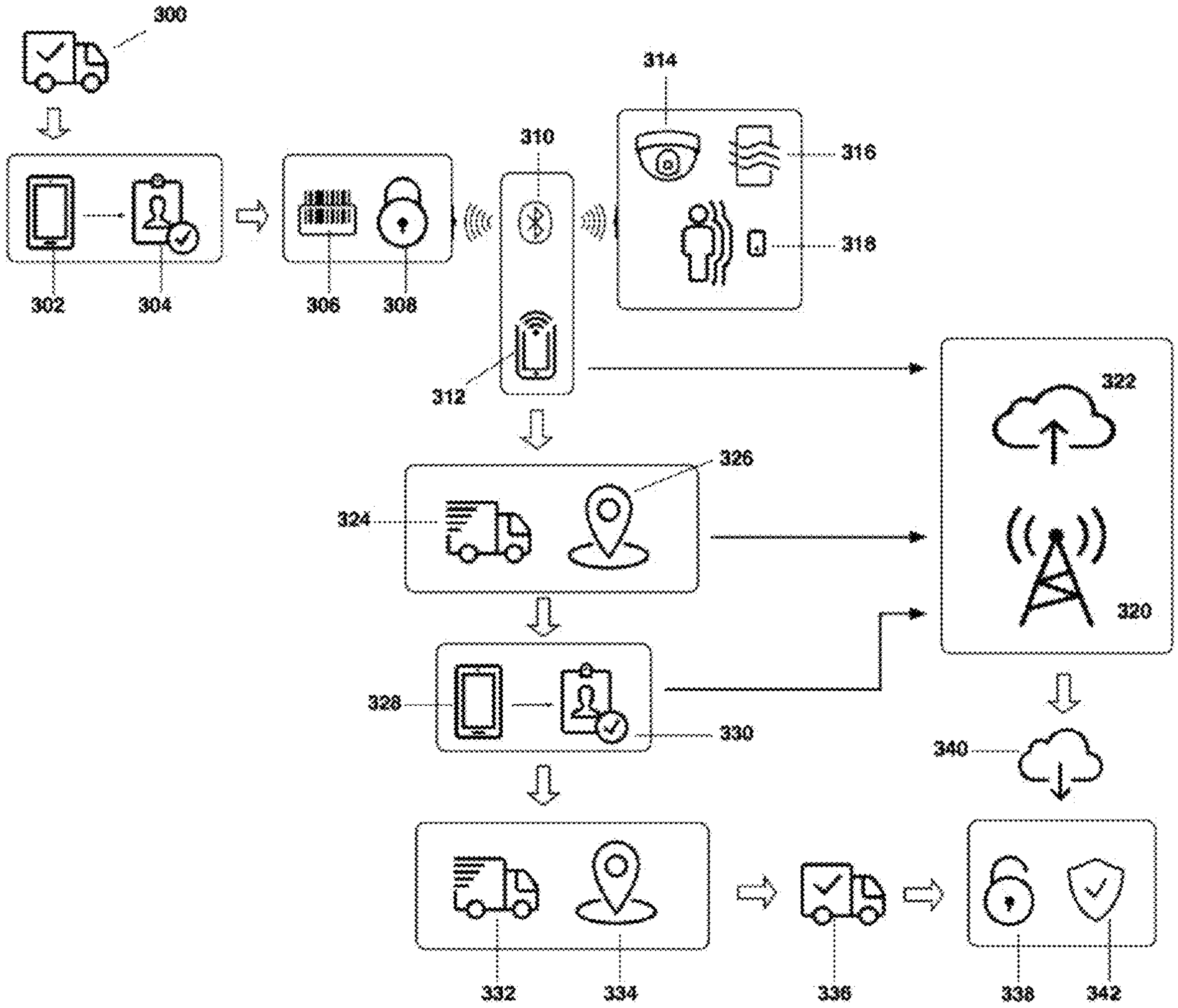
FIG. 3 is a block diagram overview of the system and how it is used.

FIG. 3 is a block diagram overview of the system and how it is used. According to the present invention, the system is applicable to transportation of assets, and each asset transport is initiated with the system user securing the asset inside a designated tractor trailer at the designated pick up location 300. Once the asset is securely locked in the trailer, the user then logs in to the application using a mobile device 302. The user enters secure login verification details 304 that include a username and password, facial recognition or thumbprint verification. Once the identity of the user has been verified within the application, the user proceeds to complete the asset intake and pickup confirmation by using the scan and camera modules within the application 306, and verify that the electronic lock 308 is securely locked on the rear door of the trailer.

The user also must verify that the Bluetooth wireless signal 310 is communicating between the electronic lock 308, the user's mobile application 312, and the asset monitoring component 314 inside the trailer. The monitoring component 314 wirelessly transmits data that includes motion detection 318, and internal temperature 316, between the electronic lock 308 and the mobile application 312. This data is aggregated and wirelessly transmitted 320 to be stored in a secure wireless application server 322 for access by all system users authorized to view this specific set of data.

Once the asset intake process is complete, the pickup is confirmed and the asset is now designated as in transit to a designated location 324. The mobile application transmits real-time geolocation data 326 of the tractor trailer wirelessly 320 to the secure application server 322. If the asset transportation itinerary specifies more than one designated asset transportation user, the first user is responsible for arriving at a designated point to initiate asset hand-off to the next user. The intake process is repeated, with the second user verifying that the asset is secured. The secondary user must complete the verification process using their mobile device 328 and completing the login verification and intake process 330. This asset hand-off data is then wirelessly transmitted 320 to the secure application server 322. Once the secondary user completes the hand-off and asset intake verification process, the asset is now designated as being in transit with the secondary user 332 and tracked using geolocation data 334 from the secondary user's smartphone. Once the asset reaches the delivery destination point, another hand-off is done with the delivery contact system user 338 and the asset status is verified and marked as complete on the mobile application 336. The delivery contact system user is able to access all asset transportation data by downloading a detailed report from the secure application server 340 by logging in to the system application 342.

Figure 4:
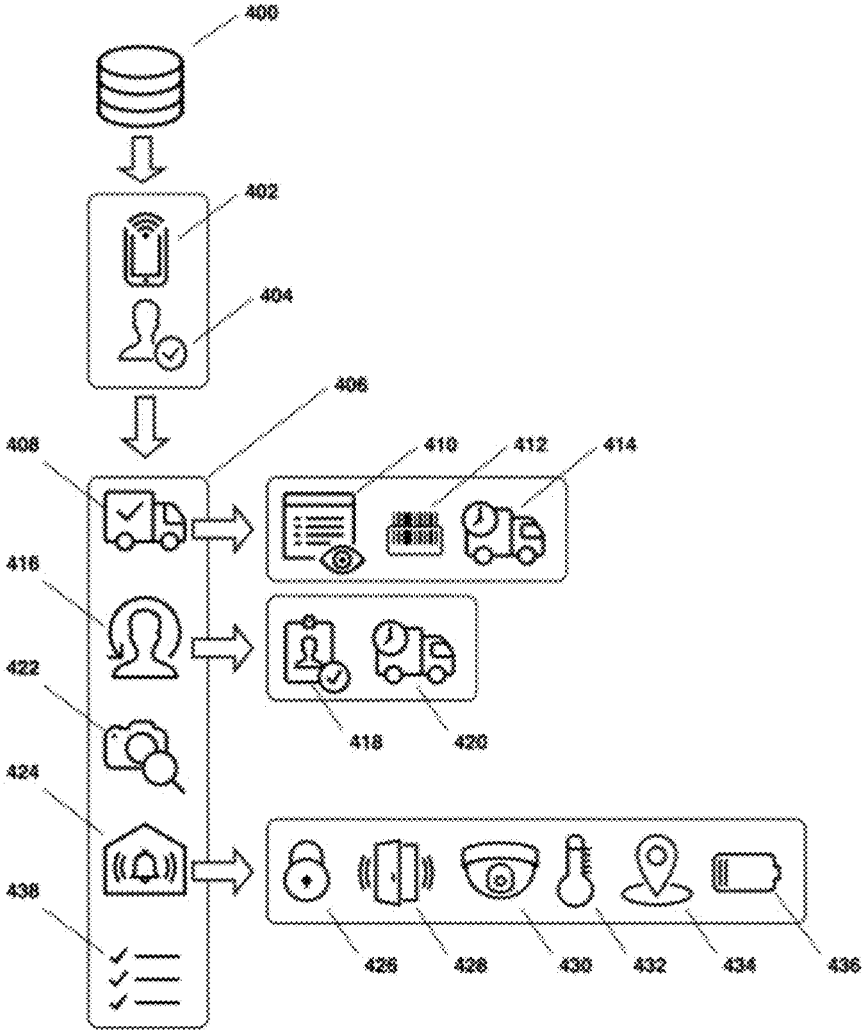
FIG. 4 is a block diagram of the mobile application monitoring system user interface.

FIG. 4 is a block diagram of the mobile application monitoring system user interface. In accordance with the preferred embodiment of the present invention, the user can access the system application through a wireless mobile device 402. All data collected in the asset transportation monitoring system is stored on a secure external application server 400. The server wirelessly transmits the data to the application on the user's mobile device 402. To access the data, the user enters secure login verification details 404 that include a username and password, facial recognition or thumbprint verification. Once the identity of the user has been verified within the application, the user is able to view the application interface menu 406. Through the interface, the user is able to access real-time information regarding asset transportation in progress 408.

Selecting this module allows the user to access the details pertaining to the asset specifications and delivery information 410, such as the designated delivery address and contact information of the recipient. Through this module, the user can access specific identification profile information 412 related to the asset and the tractor trailer, as well as a full itinerary 414 that includes a Global Positioning System ("GPS") map feature and real-time updates on the scheduled asset pickup, hand-off, and delivery date and time. The user is able to report a user hand-off event 416, whereby the user can verify and confirm the secondary user 418, and log the hand-off information, including the location, date and time, into the assignment database on the secure application server 420. The user can access the photo verification module 422 to visually log the status of the asset in the secure application server. The user is also able to view all alerts transmitted from the monitoring device 430, and the electronic lock 426, including but not limited to: rear trailer door movement 428, temperature inside the trailer 432, location status of the asset in relation to the current detected geo-location of the trailer 434, and the battery status for both the monitoring device and the electronic lock 436. The user can also view the history and status data log of all previous asset transportation assignments completed, as well as upcoming assignment information 438.

Figure 5:
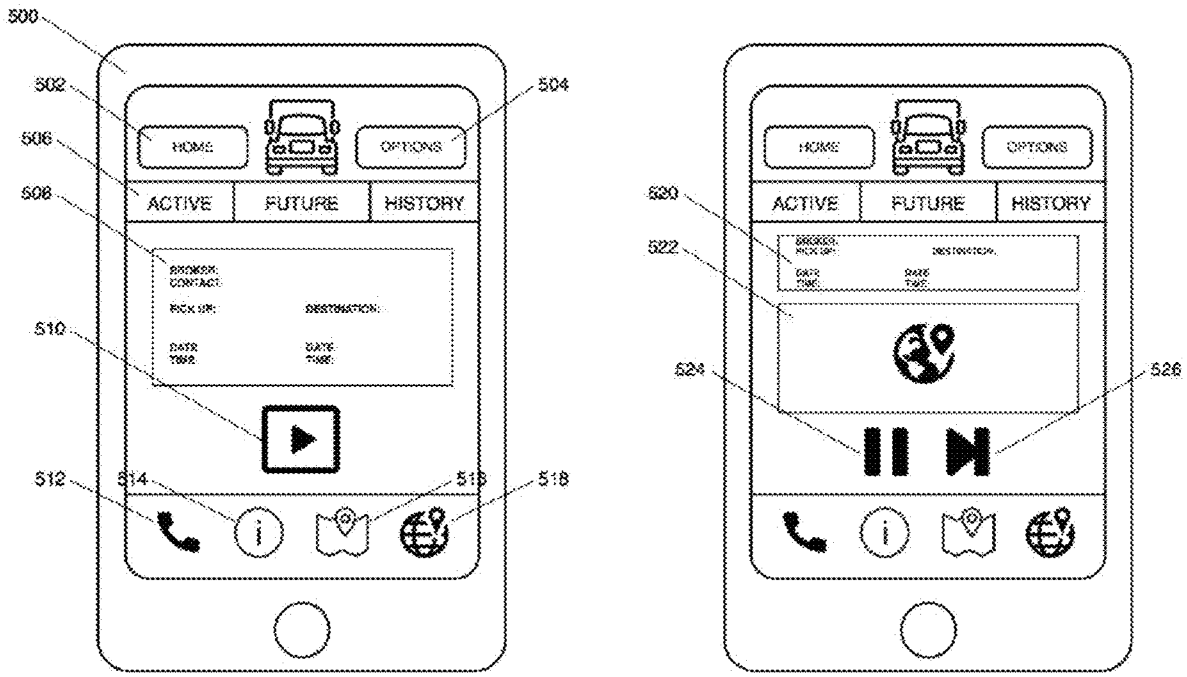
FIG. 5 is a rendering of the smartphone application user interface when accessed on the user's mobile device.

FIG. 5 is a rendering of the smartphone application user interface when accessed on the user's mobile device 500. According to the preferred embodiment of the present invention, the mobile application is a key component that serves as an information and communication hub between the user, the trailer monitoring device, the electronic lock, the secure application server, and all authorized parties related to the transportation of a specific asset. The main page of the application user interface is accessed one the user verifies login information. Once the user identity is verified, the user interface is displayed and can be accessed at any point throughout the application by selecting "HOME" 502. The user can access system settings mobile settings by selecting "OPTIONS" 504. The user can navigate between "ACTIVE" asset transportation data, "FUTURE" asset data for upcoming assignments, and "HISTORY" data related to previous asset transportation assignments in the top navigation banner 506.

The user interface displays key data related to the current asset transportation assignment on the home page, including the broker, the contact, the pick-up and destination addresses, date and time for each 508. The user initiates the start of the assignment by selecting the start button 510 on the main page. Once the user starts the assignment, a real-time updated Global Positioning System ("GPS") enabled map is displayed 522, and this location data is time stamped and saved on the secure application server assignment log. The user also has the option of viewing a full map overview of the assignment by selecting the GPS icon 518 located on the bottom banner. Once the assignment has started, the user can select the pause icon 524 to log in break times and the stop icon 526 when the assignment is complete. For the duration of the active assignment, relevant information is condensed and displayed on the main interface 520. The user can communicate with relevant contacts directly by selecting the phone icon 512 on the bottom banner, whereby the user can select if they need to call, message or e-mail the contact. The user can access system information to retrieve a status update from the monitoring device and the electronic lock by selecting the system information icon 514. The full assignment itinerary details can be accessed by selecting the itinerary icon 516 on the bottom banner menu.

Figure 6:
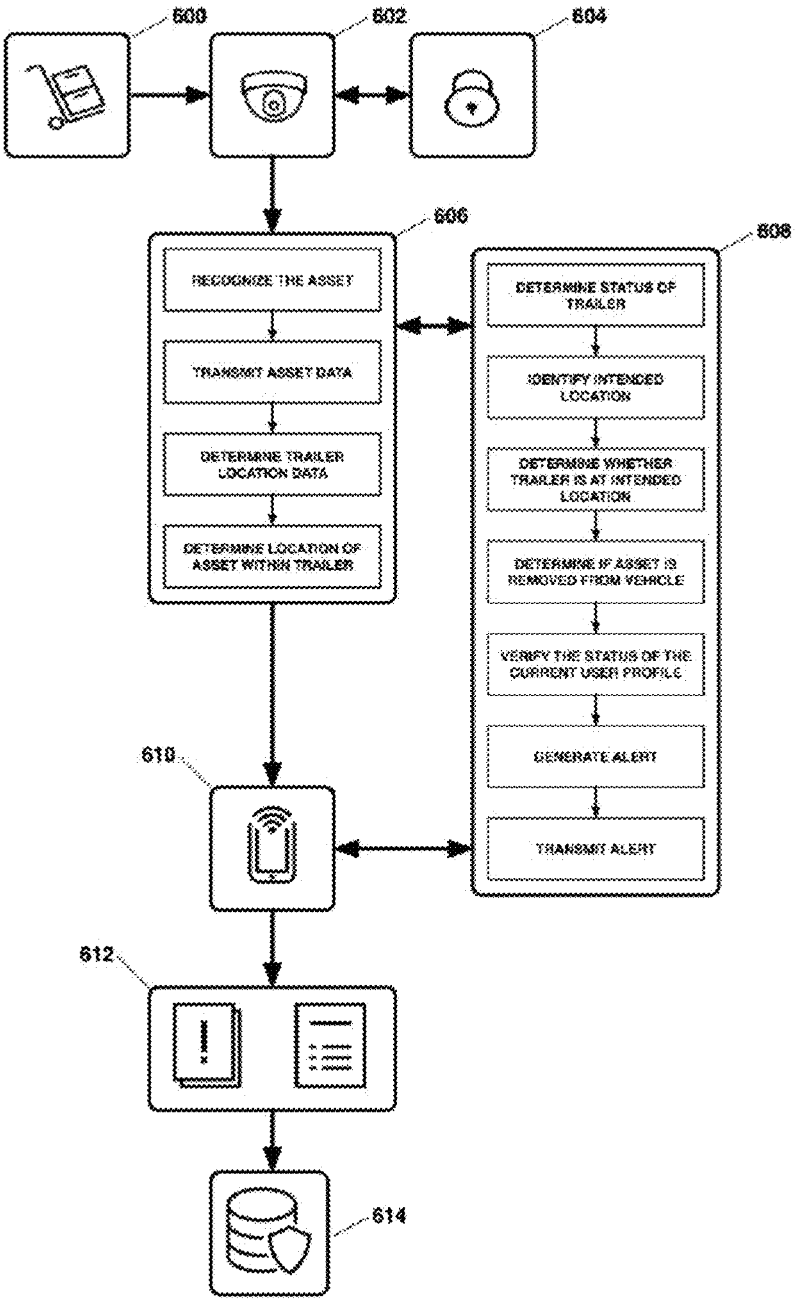
FIG. 6 is a block diagram of the of the communication between the monitoring device, the electronic lock, and the mobile application.

FIG. 6 is a block diagram of the of the communication between the monitoring device, the electronic lock, and the mobile application. In accordance with the preferred embodiment of the present invention, the assets 600 placed inside the trailer for transport are monitored by the monitoring device 602 secured in an optimal location inside the trailer. The monitoring device communicates wirelessly with the externally located electronic lock 604 to transmit data pertaining to the status of the rear trailer door. The primary status actions 606 performed by the monitoring device consist of: recognizing the asset within the trailer; transmitting asset data; identifying trailer location data; and determining the location of the asset within the trailer. The monitoring device 602 then performs a series of secondary status actions 608 that include: determining trailer status; identifying the intended location; determining whether trailer is at the intended location; determine if asset is removed from the trailer; verifying the status of the current user profile; generating an alert; and transmitting the alert to the mobile application. Once this additional data is transmitted to the mobile application 610, an alert notification is generated and the transmitted event data is logged into the job report 612. The alert, event data and report are all transmitted and stored wirelessly to the secured external application server 614.

Figure 7:
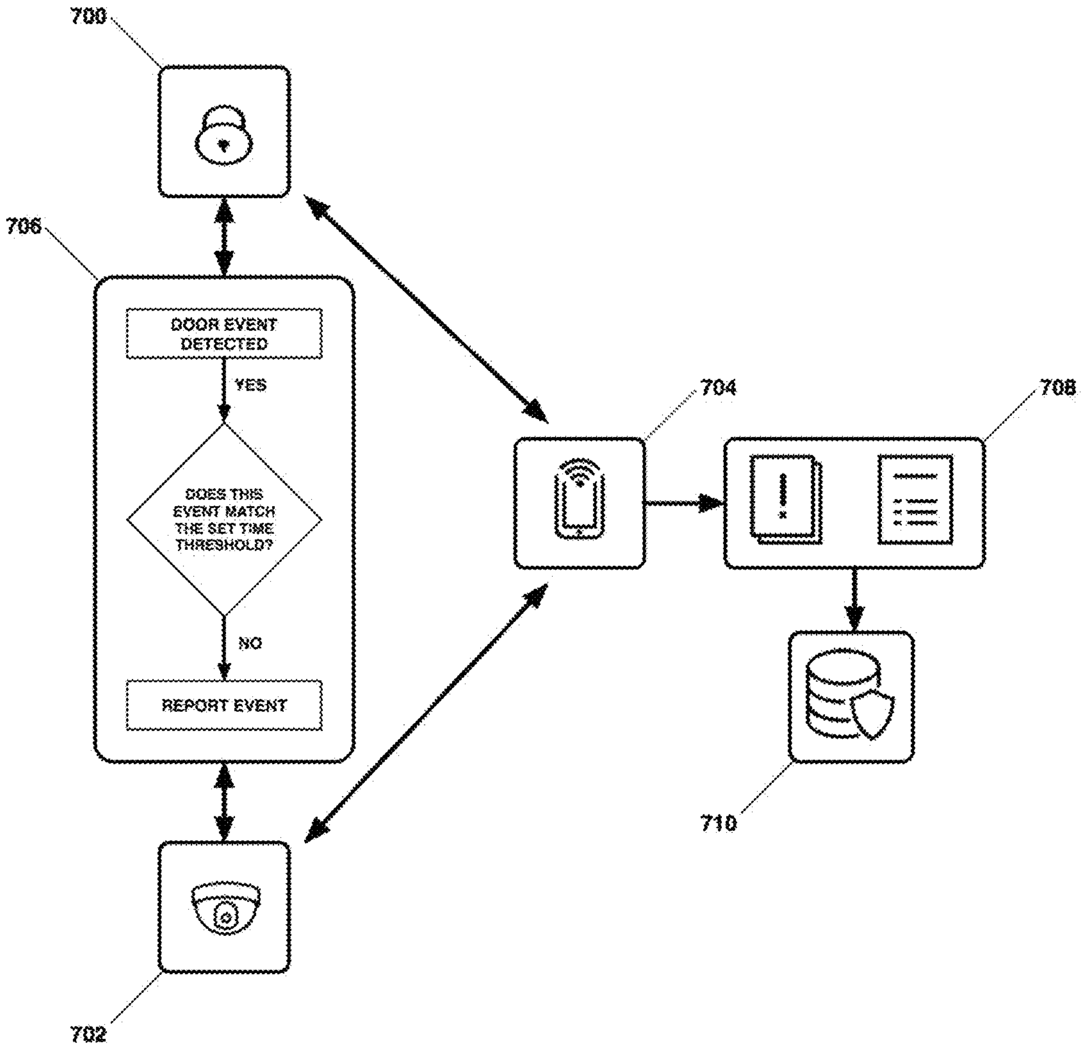
FIG. 7 is a block diagram of the event detection process performed by the electronic lock.

FIG. 7 is a block diagram of the event detection process performed by the electronic lock. In accordance with the preferred embodiment of the present invention, the electronic lock 700 is secured to the rear door locking lever of the trailer. Once it is locked and activated by the user through the mobile application, the electronic lock 700 will communicate with the monitoring component located inside the trailer and transmit status updates and alerts to the application 704 on the user's mobile device. The primary function of the electronic lock 700 is to monitor status of the trailer door 706. If the electronic lock is opened or if the trailer door is opening, the electronic lock 700 registers this as an event. The lock can be set to certain parameters, including but not limited to a timer through the application to transmit events based on a specified time frame to other events. If this event exceeds the set parameters, the event is transmitted as an alert or status update to the mobile application 704.

The electronic lock 700 also communicates with the monitoring component 702 inside the trailer to verify if the external event corresponds with any events occurring inside the trailer. The monitoring component 702 can detect additional corresponding events related to motion and light sensors that can potentially occur in a detected door event 706. Once this additional data is transmitted to the mobile application 704, an alert notification is generated and the transmitted event data is logged into the job report 708. The event data 708 can include the date, time, and location in the report for reference. The alert, event data and report are all transmitted and stored wirelessly to the secured external application server 710.

Figure 8:
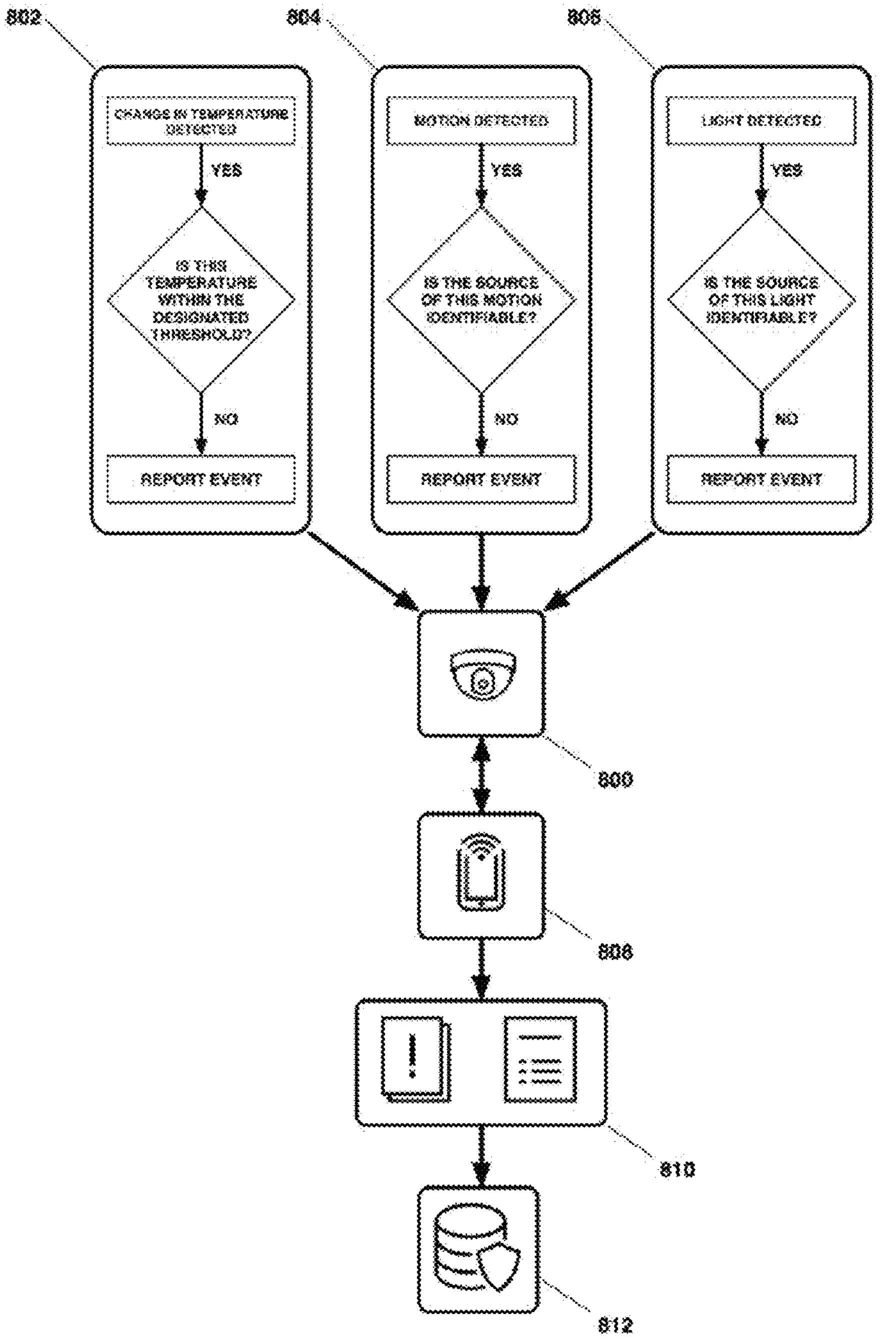
FIG. 8 is a block diagram of the status and event detection process performed by the monitoring device.

FIG. 8 is a block diagram of the status and event detection process performed by the monitoring device. In accordance with the preferred embodiment of the present invention, the monitoring device 800 is secured in an optimal monitoring location inside the trailer with an unobstructed view of the asset. The primary function of the monitoring device 800 is to detect changes in the conditions inside the trailer to secure the asset. A variety of sensing functions can be integrated into the monitoring device 800. One specific function is to detect a change in trailer temperature 802, and determining if there is a temperature change that exceeds pre-set temperature parameters, whereby an alert is transmitted to the mobile application 808.

Another function is to detect motion inside the trailer 804, determining if the source is identifiable and generating an alert 808 if the motion source cannot be identified in the system parameters. A third function is to detect changes in light within the trailer 806, identifying the location of the light source, and transmitting the alert to the mobile application 808. Once this additional status data is transmitted to the mobile application 808, an alert notification is generated and the transmitted event data is logged into the assignment report 810. The alert, event data and report are all transmitted and stored wirelessly to the secured external application server 812.

Figure 9:
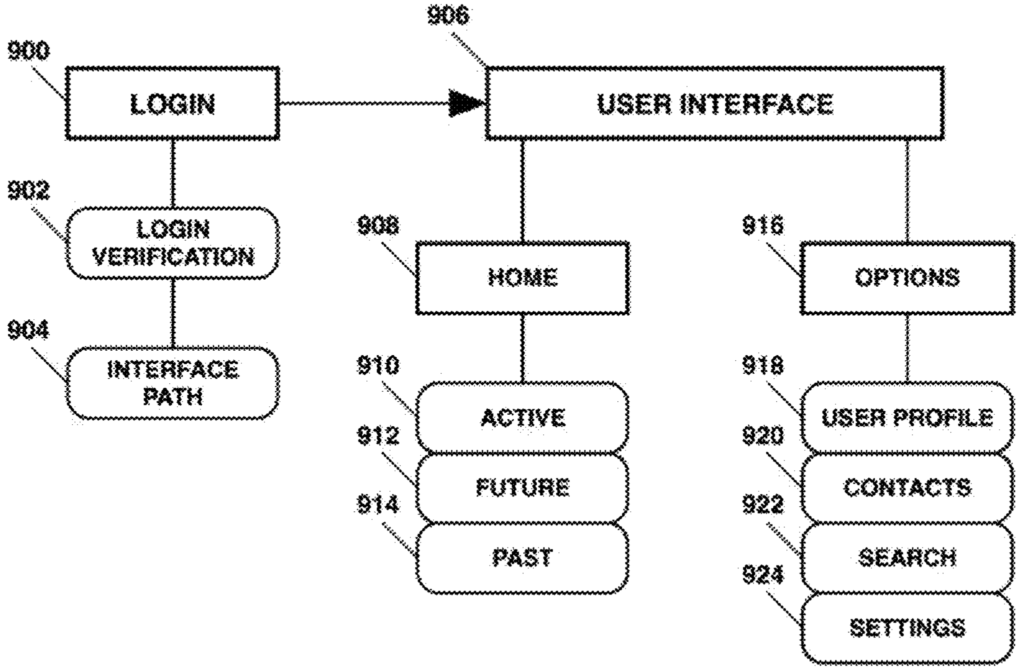
FIG. 9 is a block diagram overview of the driver application user interface.

FIG. 9 is a block diagram overview of the driver application user interface. In accordance with the preferred embodiment of the present invention, access to the mobile application requires the user to bypass the login 900 module by entering valid user identification and passcode credentials, verified through a secure system server 902. The login credentials entered are used to determine the user specific interface path 904 and user specific levels of access within the application. The driver user interface 906 is comprised of the "HOME" 908 or main navigation portal, and the "OPTIONS" 916 or secondary navigation portal. The main navigation portal 908 allows the driver to access all information and data related to the "ACTIVE" 910, "FUTURE" 912 and "PAST" 914 asset transport assignments. The secondary or "OPTIONS" 916 navigation portal allows the driver to access application features and settings including the driver's "USER PROFILE" 918, a list of important "CONTACTS" 920, GPS enabled "SEARCH" 922 functionality and application system "SETTINGS" 924.

Figure 10:
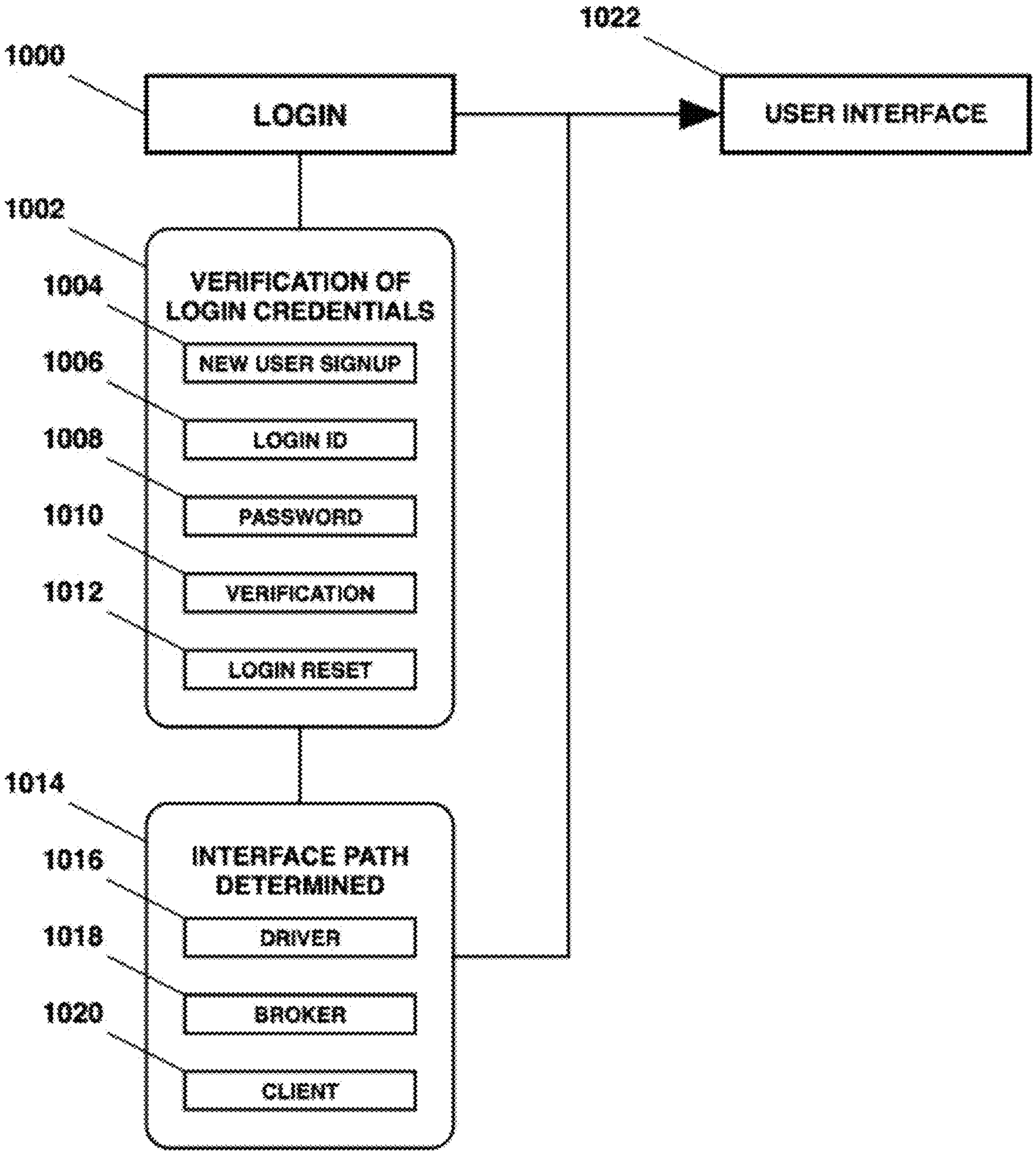
FIG. 10 is a block diagram of the login process for the driver application interface.

FIG. 10 is a block diagram of the login process for the driver application interface. According to the preferred embodiment of the present invention, the mobile application user must enter all required user login credentials through the secure login module 1000 to have access to the application user interface 1022. The entered login credentials are verified 1002 through a secure application server. If the user does not have the necessary login credentials, they must complete the new user sign in module 1004. Once the user has created an account, the user is prompted to enter a valid login ID 1006 designated for the user when the new user account was created through the new user sign up module 1004.

Next, the user must enter a secure password 1008 which can include a designated secure passcode or dual fingerprint reader identification option. The login ID 1006 and password 1008 data is verified 1010 through the secure system server. The user also has the option to reset login credentials 1012 through the login portal. The application uses the entered login data 1002 to determine the appropriate interface path 1014, whereby the user is granted access to the driver interface 1016, the broker interface 1018 or the client interface 1020.

Figure 11:
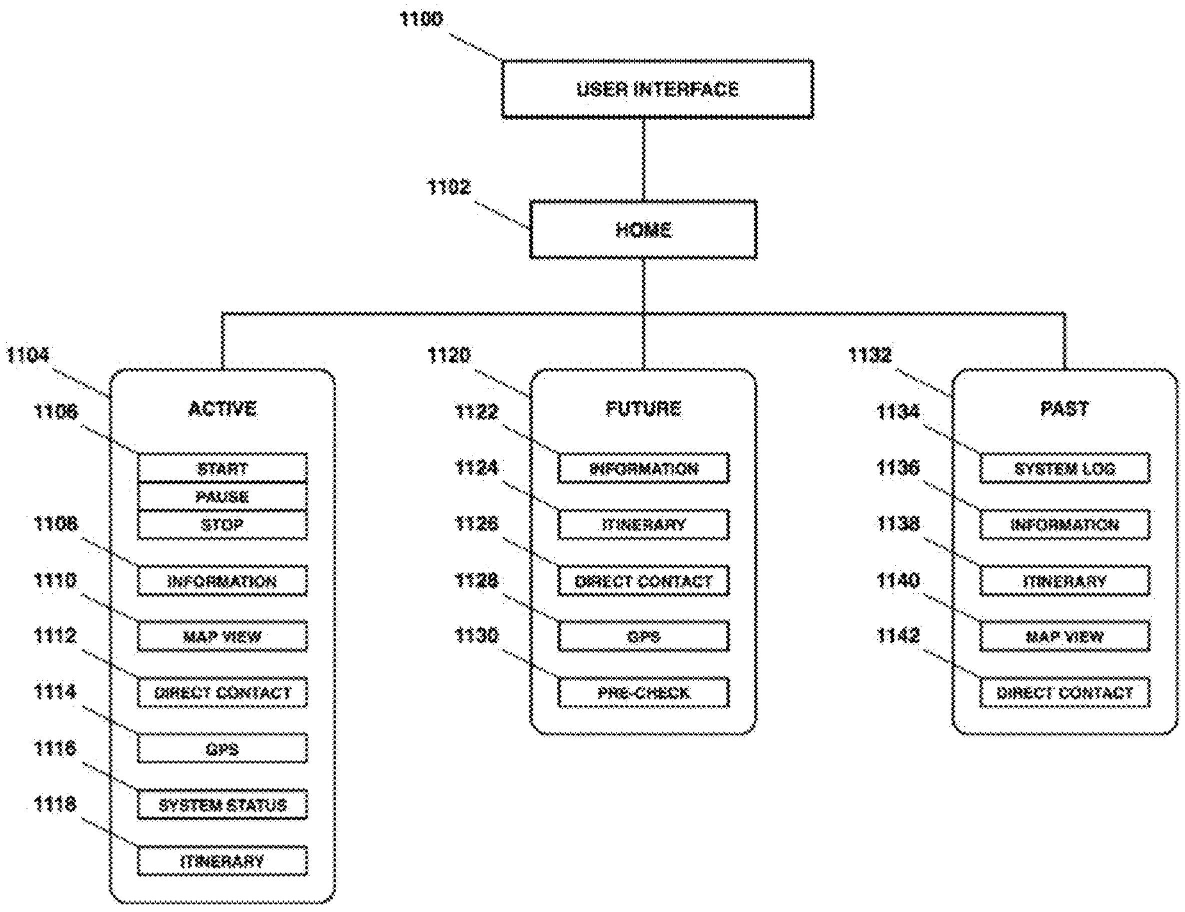
FIG. 11 is a block diagram of the home screen of the driver application user interface.

FIG. 11 is a block diagram of the home screen of the driver application user interface. According to the preferred embodiment of the present invention, the home 1102 screen of the driver application user interface 1100 is set as the default display upon successful user login. When the driver selects the “ACTIVE” 1104 module, the application interface displays the current asset transport assignment. The driver enters the assignment start time, when the driver takes breaks and when the assignment is complete by pressing the start, pause and stop buttons 1106 in this application module. Key information about the client, the asset, and relevant location points such as pick up and drop off addresses, is accessed when the driver selects the information function 1108. The active module has a map view function 1110 as well as a GPS function 1114 to assist the driver in navigating to specified location points. The direct contact function 1112 allows the driver to communicate with the client or broker by phone, email or text messaging.

The system status function 1116 provides the driver with the real time status of the electronic locking device and the trailer asset monitoring system, as well as immediately notifying the driver of alerts sent by the locking device and the monitoring system. The itinerary function 1118 allows the driver to view the complete assignment details and the events log. The “FUTURE” module 1120 on the home screen 1102 displays all upcoming asset transportation assignments, including but not limited to: Key information 1122 about the client, the asset, and relevant location points such as pick up and drop off addresses; detailed assignment itinerary 1124; direct contact with the client or broker 1126; the current location of the asset using GPS data 1128; and a pre-assignment checklist or “pre-check” function 1130 to prepare the driver for the assignment. The third module on the home screen is the “PAST” module 1132, it contains all previous data for each asset transportation assignment including: the detailed system log 1134 of all data communicated using the application, locking device and trailer monitor; Key information 1136 about the client, the asset, and relevant location points such as pick up and drop off addresses; detailed assignment itinerary 1138; a map view displaying the route taken by the driver 1140; and the option to directly contact the client and/or broker associated with the assignment 1142.

Figure 12:
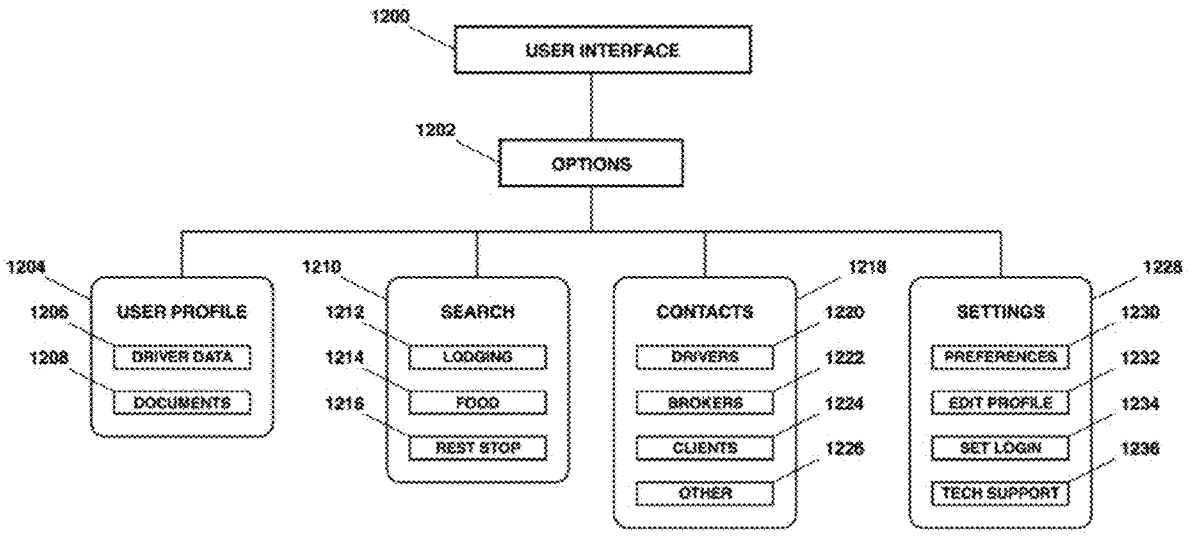
FIG. 12 is a block diagram of the options screen of the driver application interface.

FIG. 12 is a block diagram of the options screen of the driver application interface. According to the preferred embodiment of the present invention, the options screen 1202 is the secondary submenu option within the driver user interface 1200 with four separate modules. The “USER PROFILE” module 1204 contains all data related to the driver and how that data is presented to other contacts such as the broker or the client. The driver data 1206 includes information such as a picture of the driver, driver experience, asset specializations and driver contact information.

Documents 1206 including all driver licenses, training and certifications are uploaded by the driver and viewed through the “USER PROFILE” module 1204. The “SEARCH” module 1210 on the options screen 1202 is a roadside assistant navigation tool that directs the driver to the optimum lodging 1212, food 1214 and rest stop 1216 options for the driver based on GPS and route data for the current asset transportation assignment. The “SEARCH” module 1210 also allows the driver to save previous destinations, and offers incentives such as discounts or loyalty rewards tracking on designated locations. The “CONTACTS” module 1218 is a database that allows the driver to view profiles and directly contact all drivers 1220, brokers 1222 and clients 1224 within the driver’s network. There is also a section for “other” or uncategorized contacts 1226 such as family and friends, all data in this category is entered or uploaded by the driver. The “SETTINGS” module 1228 allows the driver to edit application preferences and permissions 1230, edit user profile information 1232, reset login verification data 1234 and provide application technical support, customer care and troubleshooting 1236 for the driver.

Figure 13:
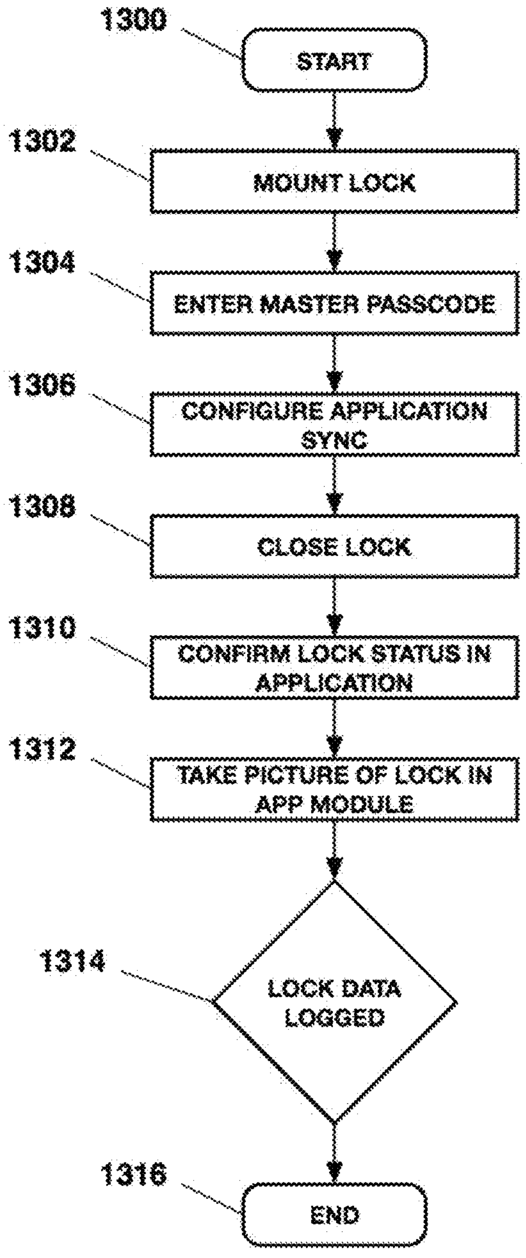
FIG. 13 is a block diagram of the activation process between the electronic lock and the mobile application.

FIG. 13 is a block diagram of the activation process between the electronic lock and the mobile application. In accordance with the preferred embodiment of the present invention, the method described is a step by step operation of the present invention for FSMA compliance purposes 1300. A truck driver has one or more powered up locks at his disposal and mounts the lock 1302, manually locking the trailer to secure the asset being transported 1308. In order to activate the lock, a master passcode 1304 may be entered either by the driver, supervising broker or client through the mobile application.

The driver must then confirm that the lock is connected to the driver’s mobile device by means of a wireless connectivity signal testing feature included in the mobile application 1310. Once the driver has confirmed that the lock can send and receive data through the mobile application, all data associated with the assigned asset is synchronized with the overall FSMA compliance system application feature 1306. The synchronized data can include: the purchase order; Electronic Data Interchange (“EDI”) compliance information associated with the payload; payload origin, itinerary, and destination. The driver completes activation and FSMA compliant data entry requirements by taking a snapshot of the closed lock 1312 using the photo verification module built into the application, confirming that the lock is closed and the payload is secured. In practice, electronic wireless Bluetooth locks can send a signal to a smartphone indicating this status.

The locked state is logged 1314 and securely stored on the internal memory of the electronic lock, the internal memory of the smartphone, and wirelessly transmitted to be stored in a secure external application server. Data stored on the external server can then be accessed within the FSMA monitoring system of the load supervisor or client. The activation and data intake process are then complete 1316, and the asset is ready for transport in a manner compliant with FSMA standards.

Figure 14:
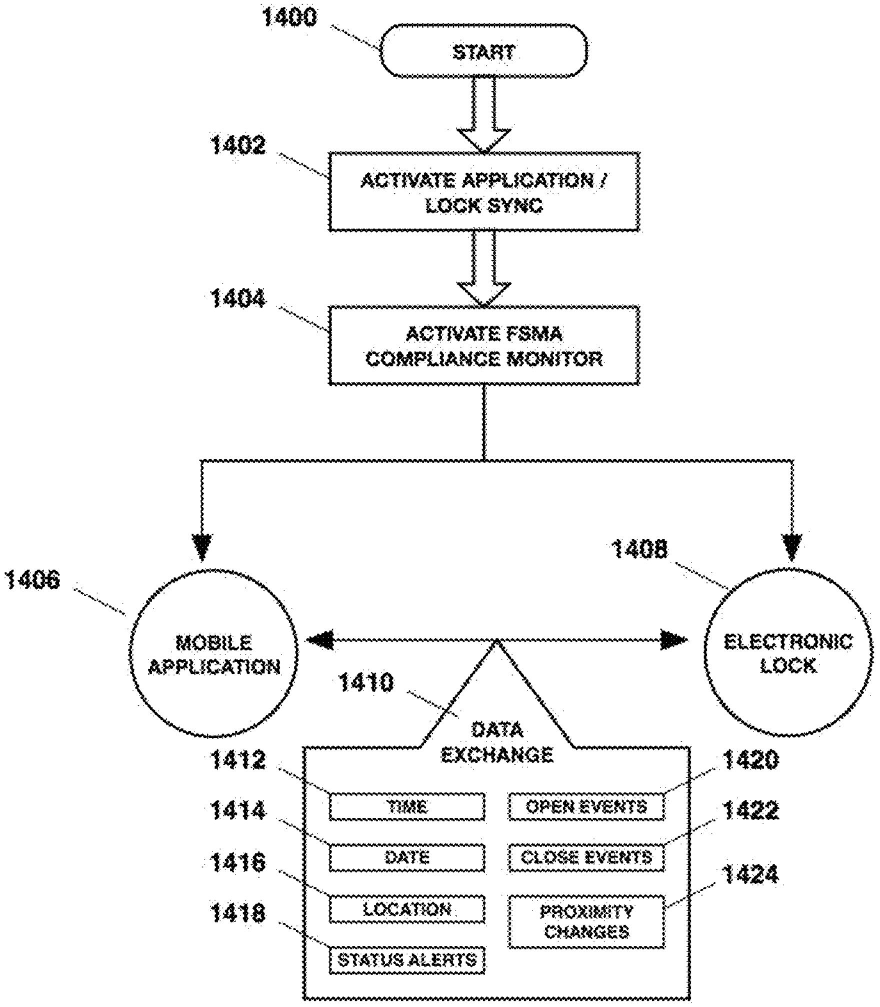
FIG. 14 is a block diagram describing data communication and exchange pathways between the electronic lock and the mobile application.

FIG. 14 is a block diagram describing data communication and exchange pathways between the electronic lock and the mobile application. In accordance with the preferred embodiment of the present invention, data intake has been entered and the status of the closed lock is confirmed at the start of asset transport 1400. The driver activates wireless data communication between the mobile application and the lock 1402. The driver then activates the FSMA compliance monitor through the mobile application 1404, allowing all data transferred from the lock to synchronize with the FSMA monitor to ensure compliance with FSMA guidelines. The mobile application 1406 is running on the driver's smartphone, including both iOS and Android systems. The electronic lock 1408 is able to exchange data 1410 with the mobile application 1406, including but not limited to: time 1412; date 1414; GPS-based location 1416; status alerts such as battery power or device damage 1418; when the electronic lock has been opened 1420 or closed 1422; and any changes in proximity to the mobile device 1424 which may disrupt Bluetooth connectivity.

Figure 15:
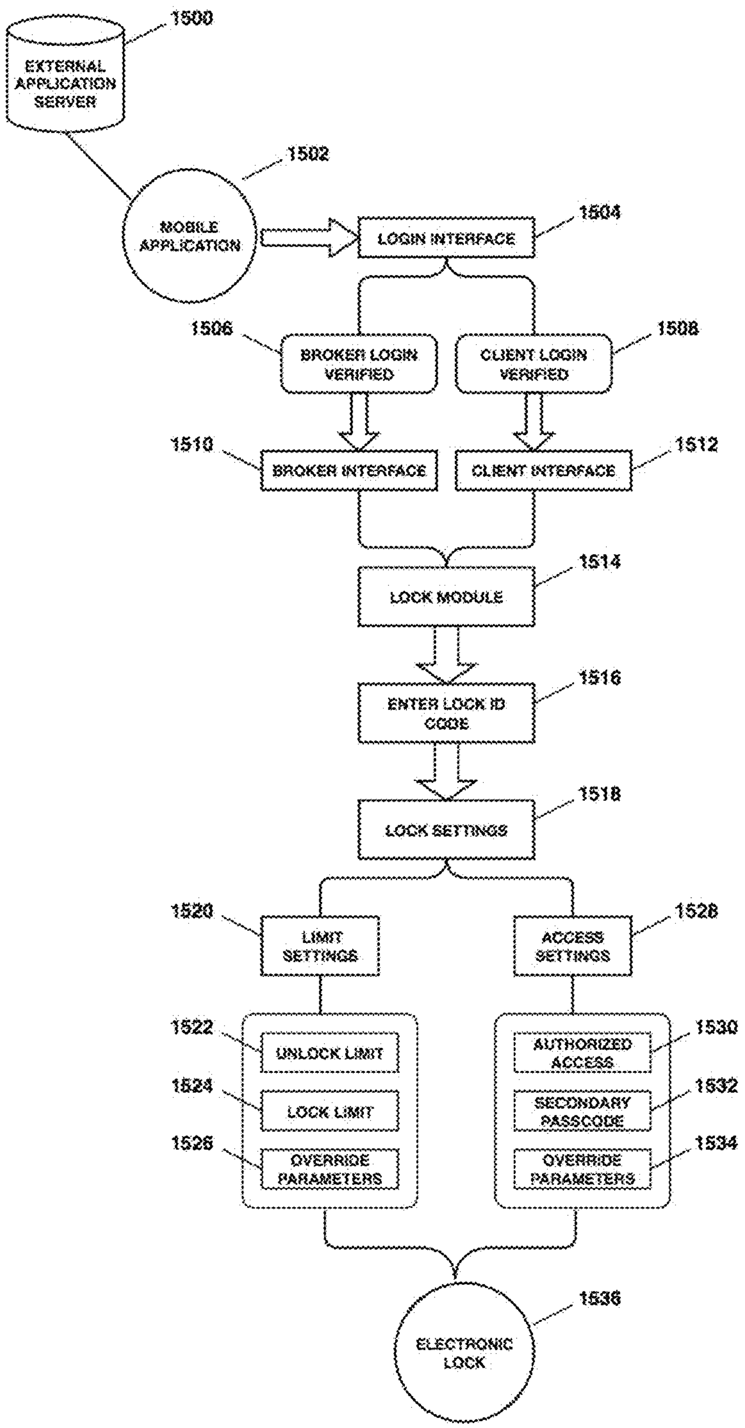
FIG. 15 is a block diagram that describes an overall data architecture for the Broker and Client application interface that allows for the user to set limit parameters and lock access permission parameters for the electronic lock.

FIG. 15 is a block diagram that describes an overall data architecture for the Broker and Client application interface that allows for the user to set limit parameters and lock access permission parameters for the electronic lock. In accordance with the preferred embodiment of the present invention, the mobile application 1502 may be configured to allow for administrative for the supervising broker and the client. A data repository stored on an external application server 1500 can be accessed by the client or the broker through the mobile application 1502. On the main login interface, the client or broker enter login credentials 1504 that are verified through the application and server. A login interface 1504 may include a PIN or fingerprint, much as is used with banking applications. An app may be configured for broker access 1505 or client access 1508.

A broker interface 1510 and a client interface 1512 may be identical or diverging so that various levels of monitoring and control may be achieved. In many cases, it could be that the transport company has more or less control over FSMA compliance, so any number of monitor and control is possible with the present invention. The login requirements for clients and brokers are differentiated and directed to the appropriate interface based on user role. Valid broker login 1506 credentials grant access to the broker interface 1510, whereas client login credentials redirect to the client interface 1512. These interface pathways grant administrative level access and remote system monitoring and control capabilities, including lock settings accessed through the lock module 1514 located on an administrative interface. A valid and active lock identification code 1516 must be entered and verified to remotely control lock settings 1518. A lock module 1514 controls the operation of the lock and ensures its status at all times, and only a lock ID code 1516 may cause a lock to operate a locking cycle. The limit settings module 1520 controls limit parameters on locking and unlocking 1522 the electronic lock, as well as override system for emergencies. Lock settings 1518 may be established so that only a limited number of locking cycles may be effected by a driver over a particular trip or series of trips. Importantly, proper FSMA compliance is necessary whether communication with a loading supervisor or its owner is live or not.

The present invention is designed to operate whether online with a cell tower or wireless network (or satellite link) or not. That is made possible because the present invention allows for storage of lock and unlock criteria, and monitoring is continuous and driver operation within permitted limits settings 1520 is possible. Lock limits 1524 and unlocks limits 1522 are stored and may be modified by a loading supervisor once a communication link is established, and override parameters 1526 may be established by any level of permitted supervisor. The access settings module 1528 has options to set up or delete authorized users 1530; implement 2-step verification by setting a secondary passcode 1532; and emergency override parameters 1534. In this manner, farmers, brokers, truck drivers, load owners, warehouse owners and operators, wholesalers, retailers, retail warehouses, etc., may all have their intended "control" level and ability to "monitor" a load, from "farm to fork".

Figure 16:
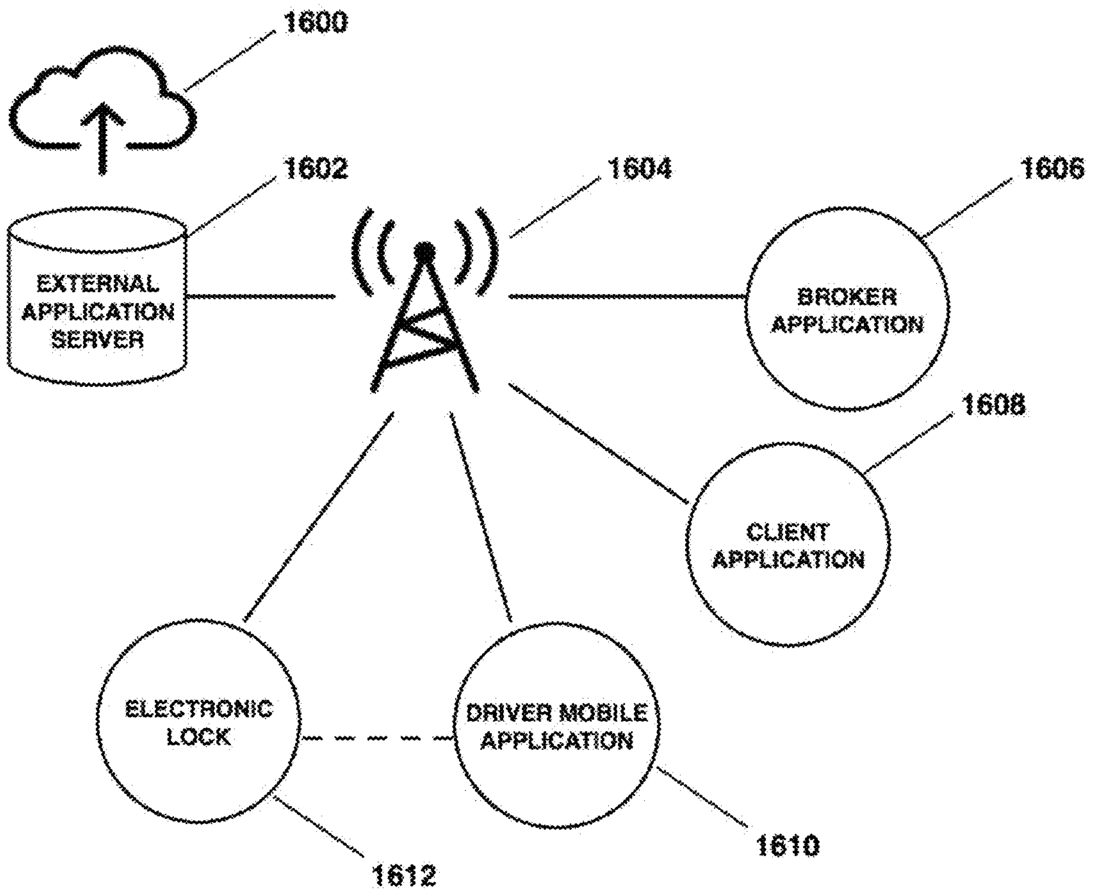
FIG. 16 is an overview of the data transmission pathways between the system server, the mobile application interface modules and the electronic lock.

FIG. 16 is an overview of the data transmission pathways between the system server, the mobile application interface modules and the electronic lock. According to the preferred embodiment of the present invention, data from all system devices is transmitted wirelessly 1604, aggregated and stored on the secure external application server 1602 and FSMA control system cloud server 1600. The broker application interface 1606 and the client application interface 1608 are primarily used in administrative functions, with data being exchanged directly between the external application server 1602 and FSMA cloud server 1600. This allows Brokers 1606 and clients (load owners) 1608 to monitor and maintain FSMA compliance in real-time. The driver application 1610 interface acts as a hub, able to aggregate and transmit data between the Bluetooth connected, proximity dependent electronic lock 1616 and trailer monitoring system, the wireless network and the external server. The lock 1602 may store and buffer both programming and status data internally provision to driver smartphone apps (which may store programming and status information, buffering it), for streamlined and efficient transmission to the FSMA data cloud server 1600.

Figure 17A:
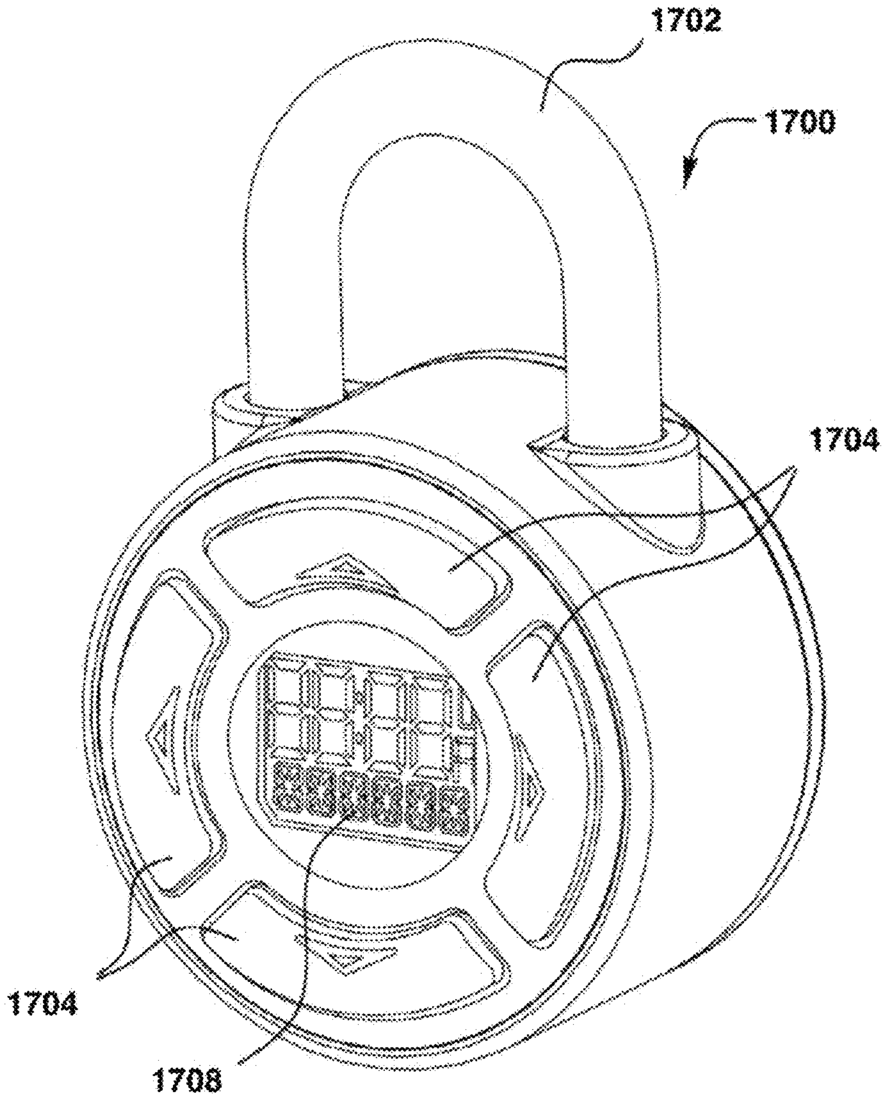
FIG. 17A is a traditional electronic wireless padlock.

FIG. 17A is a traditional electronic wireless padlock 1700 such as one manufactured by Master Lock. Shackle 1702 and lock body 1704 from the traditional parts of the lock, which operations buttons 1704 and control interface 1708 may be either on the lock 1700 itself or completely via a Bluetooth interface with a driver's smartphone.

Figure 17B:
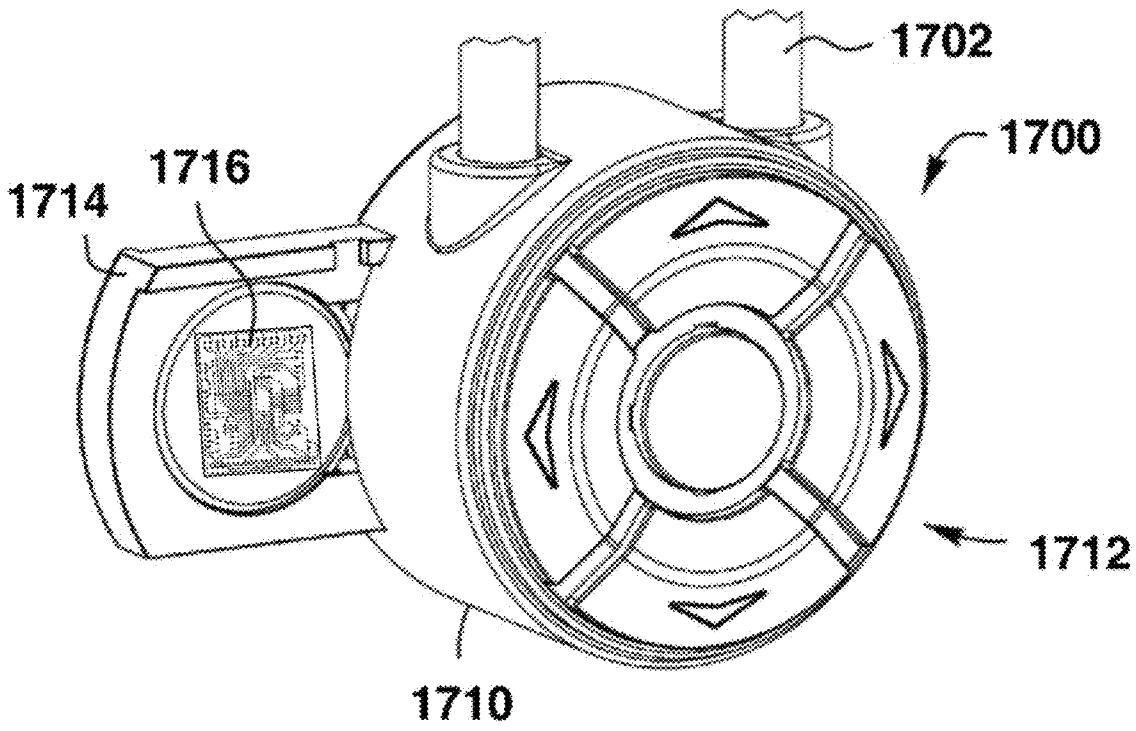
FIG. 17B is a view of an enhanced electronic wireless padlock.

FIG. 17B is a view of an enhanced electronic wireless padlock 1712, a modification to a traditional lock 1700 manufactured by Master Lock, showing a slot for a battery 1714 and or a memory card 1716, such as a SIM card, for storing programming instructions and for storing information about the operation of the lock and its operating history. Importantly, lock body 1710 must be rugged and weatherproof, suitable for truck transport and secure enough for FSMA compliance.

Figure 18:
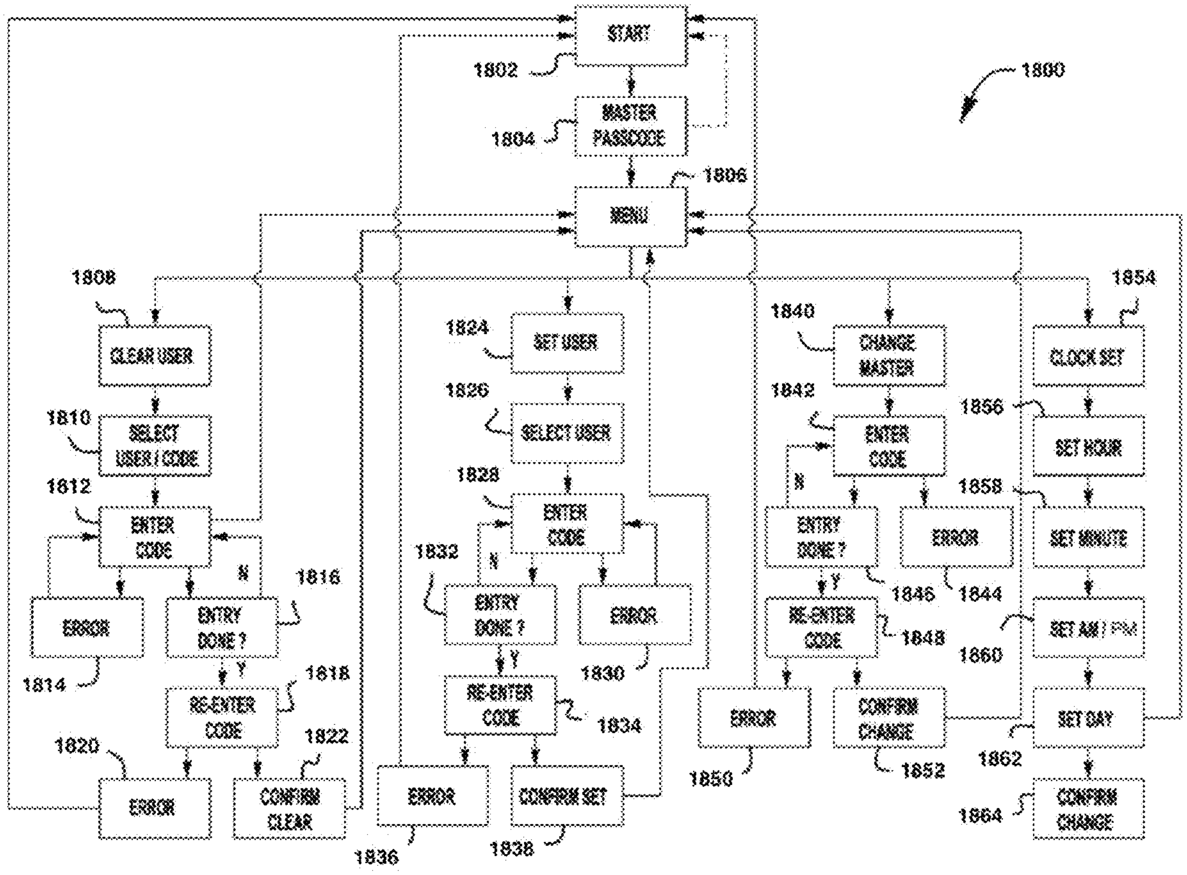
FIG. 18 is a block diagram of an exemplary lock programming menu arrangement for an electromechanical padlock, such as one manufactured by Master Lock.

FIG. 18 is a block diagram of an exemplary lock programming menu arrangement for an electromechanical padlock, such as one manufactured by Master Lock. According to the present invention, an FSMA compliant data architecture will be provided. According to FIG. 18, a menu-based arrangement 1800 for programming an electromechanical padlock. From a start condition of the lock, at block 1802, user entry of a menu access prompt (e.g., initiated by simultaneous or prolonged pressing of one or more of the keypad buttons) causes the lock display to prompt the user, at block 1804, for entry of a master passcode (e.g., to restrict ordinary users from altering the settings of the lock). This passcode may be entered using the keypad buttons, with a button entry or depressing of the shackle indicating to the PC board circuitry that the passcode entry is complete.

Upon completion of the passcode entry, the entered passcode is compared with the stored master passcode on the PC board. Identification of an entered passcode that does not match the master passcode returns the lock and its display to the start condition, while identification of an entered passcode that matches the master pass code places the lock and its display in a menu entry condition (block 1806). Keypad buttons (e.g., left and right directional buttons) may be used to scroll through available menu options (e.g., clear user passcode, add user passcode, change master passcode, set clock), and another keypad button (e.g., up directional button) may be used to select a displayed menu option. The menu may be provided with a clear user passcode menu item (block 1808). When the clear user passcode menu item is selected, a display prompt for the user to be cleared (block 1810) is shown. The user may scroll (e.g., using directional buttons) between established user numbers, usernames/initials, or other passcode storage positions to select the passcode position (using a corresponding directional button) to be cleared from the stored set of authorized user pass codes.

The lock display will then prompt the user for entry of the corresponding passcode to clear or remove (at block 1812). In other embodiments, the menu arrangement may exclude user selection (block 1810) and immediately prompt for the passcode to clear or remove. An invalid code entry (e.g., too many button pressings) may prompt an error display (block 1814) and a return to the passcode entry prompt (block 1812). A delay (e.g., 5 seconds) in button pressings may initiate a display prompt to confirm whether the user is done setting the code (block 1816). A "no" entry (e.g., down directional button) returns the lock display and setting to the passcode entry prompt (block 1812). A "yes" entry (e.g., up directional button) may cause a code re-entry prompt (block 1818) to be displayed, for example, to obtain confirmation that the passcode to be removed has been correctly entered. An invalid code re-entry (e.g., second entered code doesn't match first entered code) or a timed-out condition (e.g., 10 second delay) may prompt an error display (block 1820) and a return to the starting position (block 1802) or, alternatively, to the passcode entry prompt (block 1812). A recognized match of the first and second entered passcodes generates a set user passcode confirmation display (block 1822), and the lock display returns to the menu entry condition (block 1806). The user may then exit the menu (e.g., by using the down directional button or by scrolling to an "exit" option in the menu), or may select another menu option.

The menu may also be provided with an add/set user passcode menu item (block 1824). When the set user passcode menu item is selected, a display prompt for the user number (or another passcode storage position) for which a passcode is to be set (block 1826) is shown. The user may scroll (e.g., using directional buttons) between established user numbers, usernames/initials, or other passcode storage positions to select the corresponding passcode storage position (using a corresponding directional button) to be provided with an authorized user passcode. Once selected, a display prompt for entry of the new user passcode (block 1828) is shown. An invalid code entry (e.g., too many button pressings) may prompt an error display (block 1830) and a return to the new passcode entry prompt (block 1828). A delay (e.g., 5 seconds) in button pressings may initiate a display prompt to confirm whether the user is done setting the code (block 1832). A "no" entry (e.g., down directional button) returns the lock display and setting to the new passcode entry prompt (block 1828). A "yes" entry (e.g., up directional button) may cause a code re-entry prompt (block 1834) to be displayed, for example, to obtain confirmation that the new passcode has been correctly entered. An invalid code re-entry (e.g., second entered code doesn't match first entered code) or a timed-out condition (e.g., 10 second delay) may prompt an error display (block 1836) and a return to the starting position (block 1802) or, alternatively, to the new passcode entry prompt (block 1828). A recognized match of the first and second entered pass codes generates a set user passcode confirmation display (block 1838), and the lock display returns to the menu entry condition (block 1806).

The menu may also be provided with a change master passcode menu item (block 1840). When the change master passcode menu item is selected, a display prompt for the new master passcode (block 1842) is shown. An invalid code entry (e.g., too many button pressings) may prompt an error display (block 1844) and a return to the new master passcode entry prompt (block 1842). A delay (e.g., 5 seconds) in button pressings may initiate a display prompt to confirm whether the user is done setting the master passcode (block 1846). A "no" entry (e.g., down directional button) returns the lock display and setting to the new master passcode entry prompt (block 1842). A "yes" entry (e.g., up directional button) may cause a code re-entry prompt (block 1848) to be displayed, for example, to obtain confirmation that the new passcode has been correctly entered. An invalid code re-entry (e.g., second entered code doesn't match first entered code) or a timed-out condition (e.g., 10 second delay) may prompt an error display (block 1850) and a return to the starting position (block 1802) or, alternatively, to the new master passcode entry prompt (block 1842). A recognized match of the first and second entered pass codes generates a master pass code change confirmation display (block 1852), and the lock display returns to the menu entry condition (block 1806).

The lock display may perform additional functions. For example, the lock may be provided with a clock (e.g., integral with the PC board), and the lock display may be used to display the current time and/or date, the time and/or date that the lock was last opened, or other clock-related conditions. A clock may also facilitate additional auditing functions for the lock, for example, allowing for identification of dates and times of successful and unsuccessful unlocking attempts, and unlock by specific users (as identified by user-specific pass codes). The lock menu may be provided with a clock setting menu option (block 1854). When the clock set menu item is selected, a display prompt for setting the hour (block 1856) is shown, for example, by flashing the hour position on the clock display. The user may adjust the hour setting (e.g., using up/down directional buttons) and select the current hour (e.g., using right directional button). A display prompt for setting the minutes (block 1858) is then shown, for example, by flashing the minute position on the clock display. The user may adjust the minute setting (e.g., using up/down directional buttons) and select the current minute (e.g., using right directional button).

A display prompt for selecting between AM and PM (block 1860) is then shown, for example, by flashing the AM/PM position on the clock display. The user may adjust the AM/PM setting (e.g., using up/down directional buttons) and select the appropriate setting (e.g., using right directional button). A display prompt for selecting the day of the week (block 1862) is then shown, for example, by flashing the day position on the clock display. The user may adjust the day setting (e.g., using up/down directional buttons) and select the current day (e.g., using right directional button). Similar steps (not shown) may be added for setting the date (e.g., month, day, and year). Once all the clock settings have been entered, the lock display may provide a confirmation that the clock has been set (block 1864), and the lock display may return to the menu entry condition (block 1806).

According to the present invention, either a customized electronic lock will be constructed, suitable for locking a food-carrying container such as the trailer part of a conventional tractor-trailer pair, or any other shipping vessel for land, sea or air. The company Abus-Seccor manufactures the Wapplox internet controlled lock system, parts of which may be adapted for use with the present invention. The company Allegion makes the Trelock Smartlock and the CISA Acro Electronic Access system, parts of which may be adapted for use with the present invention. The Kaba Group has its Gitcon Access Control Unit, Kwikset makes its KEVO smartphone controlled lock, RPH Engineering makes its Quicklock Electronic Padlock, Sealock Security makes its Sealtrax Asset Management System, Stanley Security makes its Shelter Series 9KX lock and Talon Brands makes its MR58 biometric fingerprint padlock. All of these have various aspects that could be adapted for use by the present invention.

Some locks are highly specialized and very ready for use by the present invention. Noke padlocks have a Bluetooth controller adapted that may in turn be interfaced for use by the present invention. The company Assa Abloy has several locks that are also evolved for use by the present invention, namely the Medeco Aperio Wireless Lock, the Medeco XT Padlock, the Medeco M3 & X4 Cliq Padlocks and the MUL-T_Lock which is GPS and GSM enabled (which goes beyond what is needed and in fact, represents "overkill" which the present invention seeks to mitigate.

Finally, Masterlock makes two locks that are nearly perfect for integration into the present invention, with minor changes: the 4401 DLH Outdoor Padlock and the 4400D Bluetooth Padlock. Both of these are perfectly suitable for inclusion with the present invention.

Figure 19:
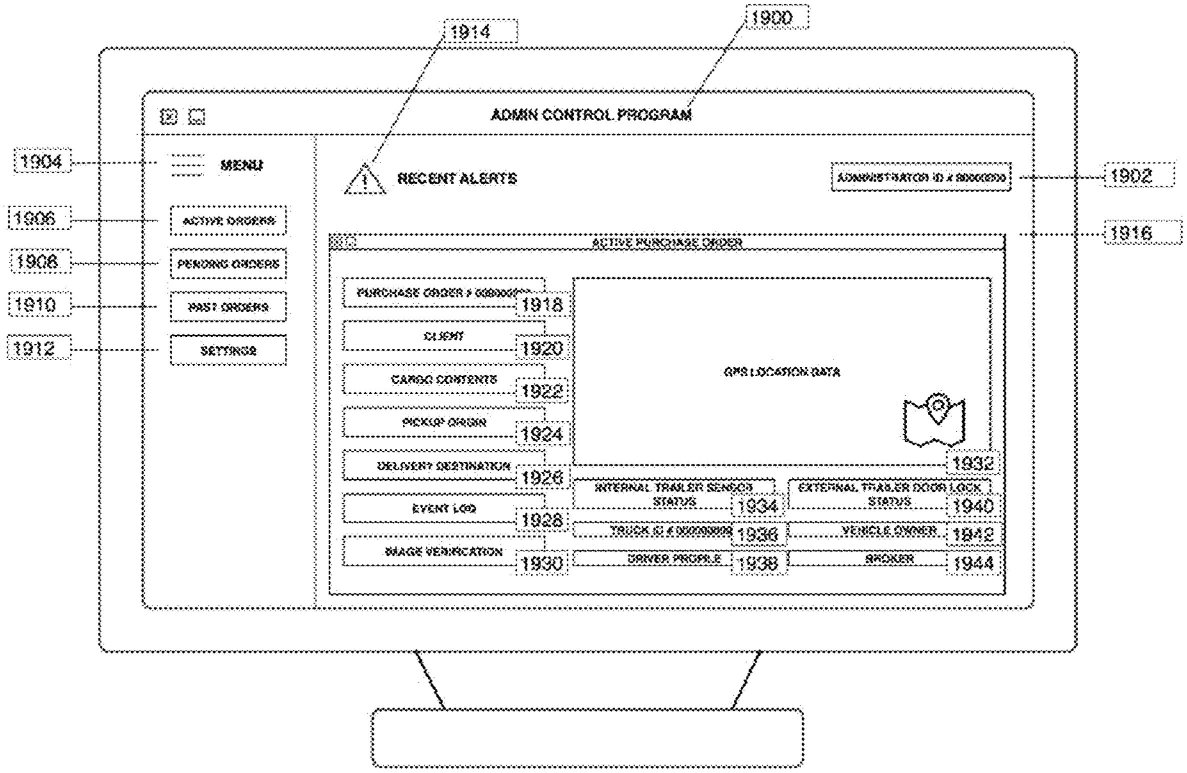
FIG. 19 is a rendering of the central data monitoring and control system administrative user interface.

FIG. 19 is a rendering of the central data monitoring and control system administrative user interface. In accordance with the preferred embodiment of the present invention, the Admin Control Program interface 1900 of the data repository system allows the designated system administrator 1902 to access all aggregated data remotely and on a secure system server. The admin program menu 1904 grants the administrator access to all data for "active orders" 1906, upcoming or "pending orders" 1908, and "past orders" 1910 from the secure database server. There is also a system settings option 1912 to set up administrative parameters. The main page of the interface allows the administrator to monitor all recent alerts 1914 for active orders in real-time, listing all events transmitted from the driver application, the trailer monitor and the electronic lock. The administrator can access each order using the purchase order number. When a purchase order number 1918 is selected, all information related to each order is displayed on a "purchase order" screen 1916.

The administrator can access all itinerary information for the purchase order 1918, including: client information 1920; cargo contents 1920; cargo pickup origin 1924; and the cargo delivery destination 1926. A complete detail of order events is accessed through the event log 1928. All image data taken by the driver using the driver app, including timestamped images of the cargo followed by the lock in the secure locked position is viewed within the image verification database 1930. The location of the driver and the cargo is shown on a real time GPS enabled map 1932, displaying live, time stamped geo-location data collected from the driver's mobile application. The status of the internal trailer sensor and any alerts detected are updated and can be monitored in real time 1934, with all data time stamped and entered into the secure system log.

The status of the external trailer door electronic is also collected, time stamped, stored and displayed 1940 for the system administrator. The data displayed in each purchase order overview panel increases the security, transportation data entry, log verification and accountability. Information pertaining to the truck identification number 1936 is displayed as a primary means of verification between the driver, the client, and the central administrator. The administrator can view driver information collected from the driver profile 1938, including but not limited to driver's license information and photo; all related training and certification data; contact information; driver experience; asset specializations and relevant system notes. The order screen also displays data of the vehicle owner 1942 and the purchase order broker 1944 for additional administrator reference. The administrator control program 1900 serves as a key data communication bridge between the driver, the broker and the client.

Figure 20:
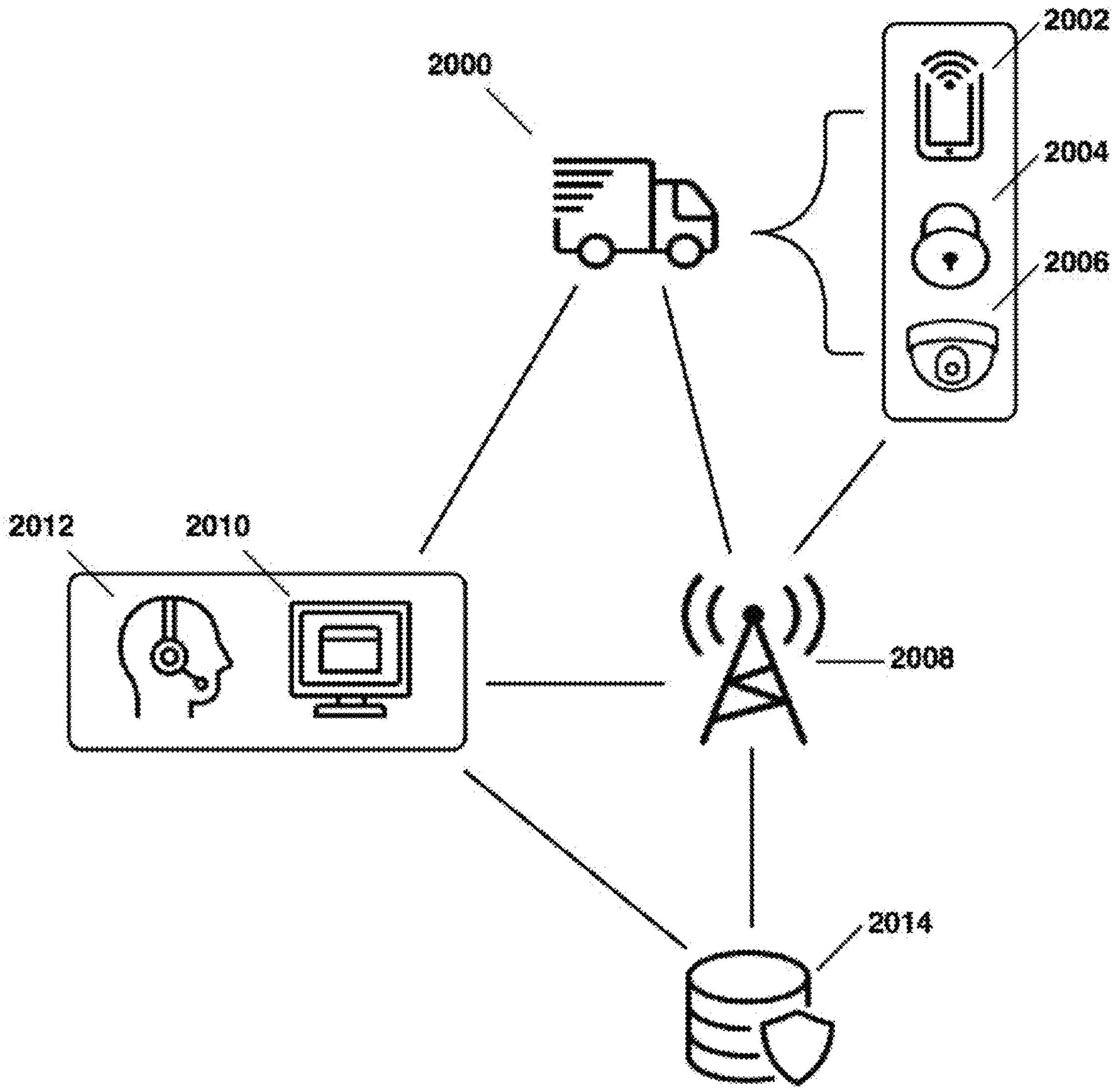
FIG. 20 is a block diagram of the driver system transportation monitoring components in relation to the control system administrator and data storage the secure server.

FIG. 20 is a block diagram of the driver system transportation monitoring components in relation to the control system administrator and data storage the secure server. In accordance with the preferred embodiment of the present invention, the driver component 2000 is actively transporting goods that are monitored by an interior trailer monitor 2006 and secured by an electronic lock 2004. The trailer monitoring system 2006 and the lock communicate wirelessly with the mobile application accessed through the driver's mobile device 2002. The driver application component 2000 wirelessly transmits data 2008 to the central monitoring system 2010, whereby the data is analyzed and processed by the system administrator 2012. All transmitted data and communication is wirelessly transmitted and stored in a secured server 2014. The driver 2000 can transmit and access data directly with the secured server 2014 through the mobile application 2002. The mobile application 2002 can also connect the driver 2000 directly to the system administrator to make requests or obtain further data analysis that is displayed on the central monitoring system 2010.

Figure 21:
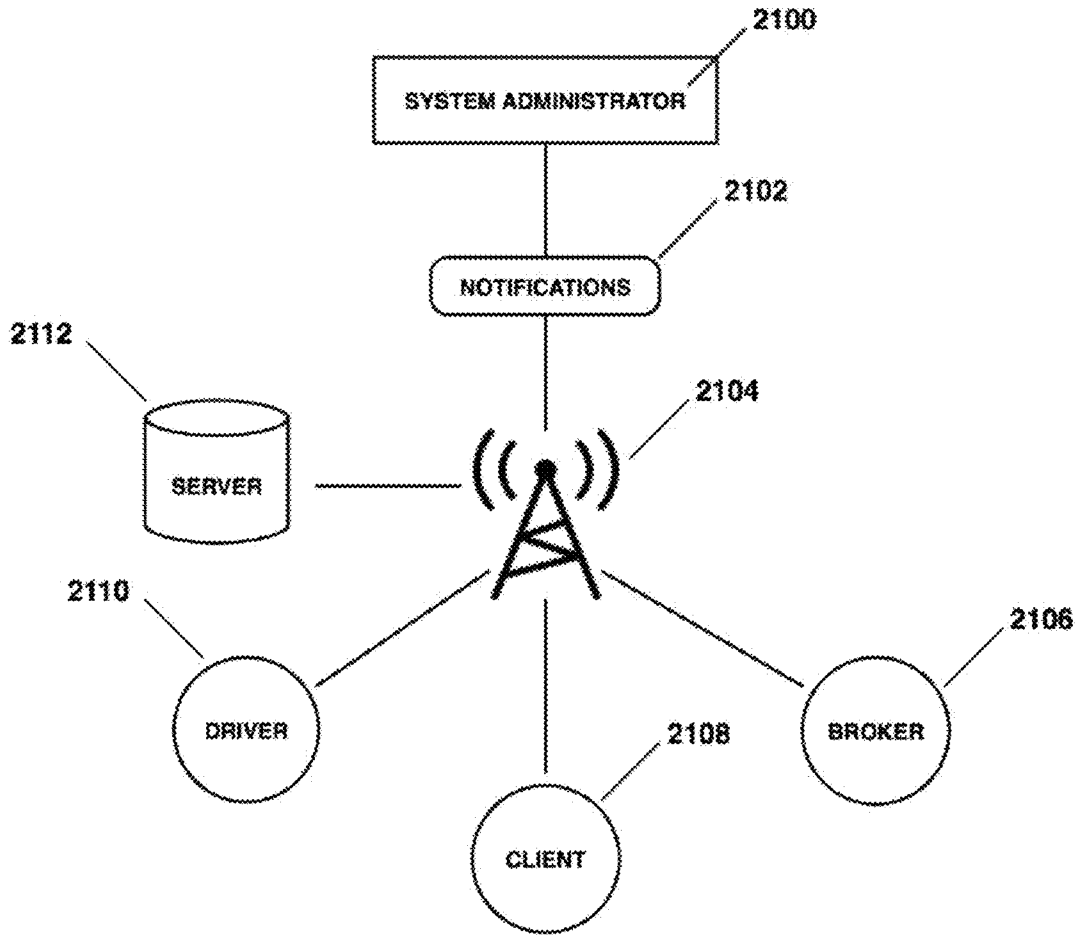
FIG. 21 is a block diagram of the system administrator notifications function connected to the driver, client, and broker.

FIG. 21 is a block diagram of the system administrator notifications function connected to the driver, client, and broker. According to the preferred embodiment of the present invention, the system administrator 2100 has the ability to initiate and override all notifications 2102 transmitted within the system. All notifications are transmitted wirelessly 2104 to the broker 2106, the client 2108, and the driver 2110. The system administrator 1000 can also oversee and approve notifications wirelessly transmitted by the broker 2106, the client 2108, and the driver 2110 remotely through a wireless 2104 mobile application. All notifications are stored in the secure system server 2112 where they are compiled in a transportation record.

Figure 22:
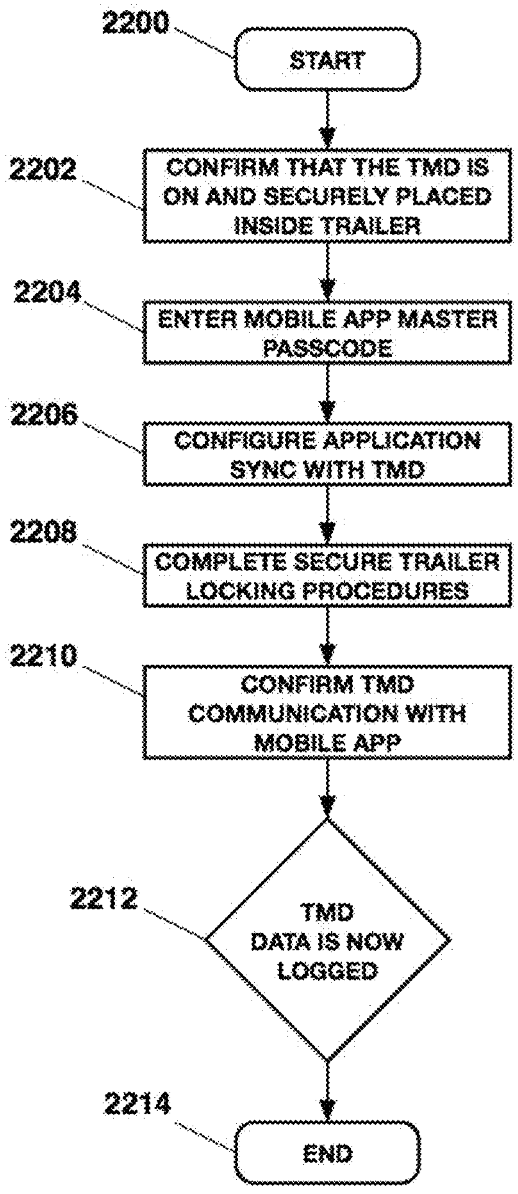
FIG. 22 is a block diagram of the synchronization set up process between the driver's mobile application and the trailer monitoring device.

FIG. 22 is a block diagram of the synchronization set up process between the driver's mobile application and the trailer monitoring device. In accordance with the preferred embodiment of the present invention, the driver must check that the TMD is securely placed inside the trailer and in working condition at the start 2200 of the route or the payload pickup point. The driver confirms 2202 that the TMD is securely placed and operational within the trailer. The driver must then securely log into the mobile application 2204 by entering the master passcode. Once the driver has securely logged in to the mobile application, the driver must configure the application to sync with the TMD 2206 via a wireless transmission signal such as Bluetooth. The TMD is then able to wirelessly communicate with the mobile application by sending trailer monitoring data and alerts to the driver as well as the secure system server. Once the TMD is synced to the mobile application, the driver must complete the secure trailer locking procedure 2208 that includes using the mobile application to take visual confirmation that the rear trailer door is locked and the electronic locking device is locked and activated. Once locking procedures are complete, the driver must confirm that the TMD is communicating with the mobile application 2210 by sending out a test signal from the mobile application to the TMD. The TMD will then send a responding signal to the mobile application and that will commence all the data logging process of all signals sent from the TMD to the mobile application 2212. This completes the set up process between the TMD and the mobile application 2214, whereby the TMD is ready for use.

Figure 23:
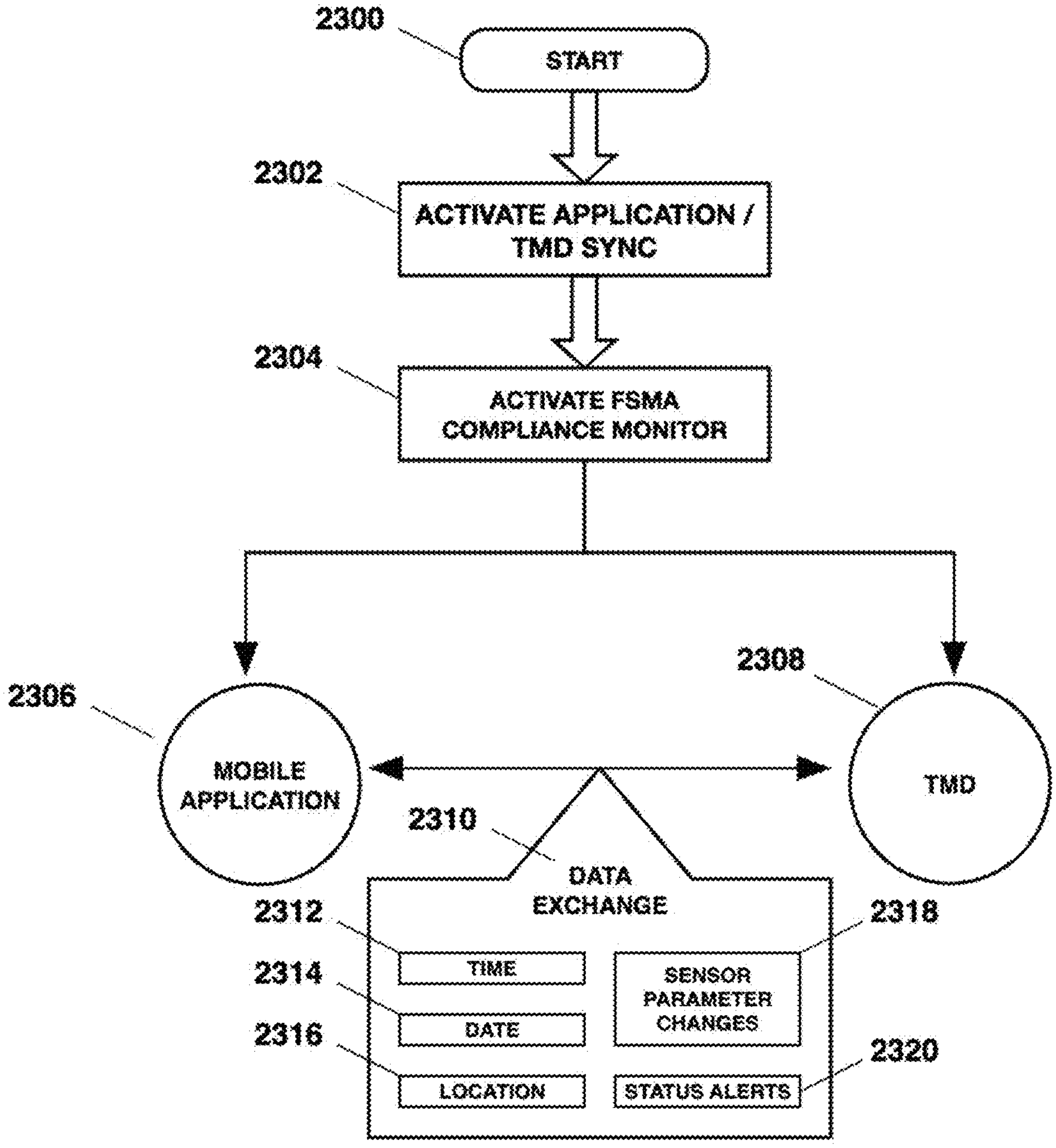
FIG. 23 is a block diagram describing the data communication and exchange pathways between the trailer monitoring device and the mobile application.

FIG. 23 is a block diagram describing the data communication and exchange pathways between the trailer monitoring device and the mobile application. In accordance with the preferred embodiment of the present invention, the transportation vehicle driver starts 2300 at the beginning of the route at the payload pickup point and activates the TMD by completing the necessary synchronization procedures with the mobile application 2302. The driver has to confirm that the FSMA compliance monitor within the mobile application and trailer monitoring device ("TMD") has been switched on or activated 2304 so that status updates are logged to the secure central server and available to be accessed by the client. Once synchronization and activation are successfully completed, the mobile application 2306 and TMD 2308 are able to wirelessly communicate back and forth with a data exchange 2310 that is wirelessly logged into the secure central server. The TMD continuously transmits status update data with the mobile application that includes; a date 2314 and timestamp 2312 of when the status update was transmitted or when the alert event occurred; the GPS location 2316 at the time of the event or transmission; current sensor readings and deviation of pre-set sensor parameters 2318; and the status event alert that triggered the transmission 2320.

Figure 24:
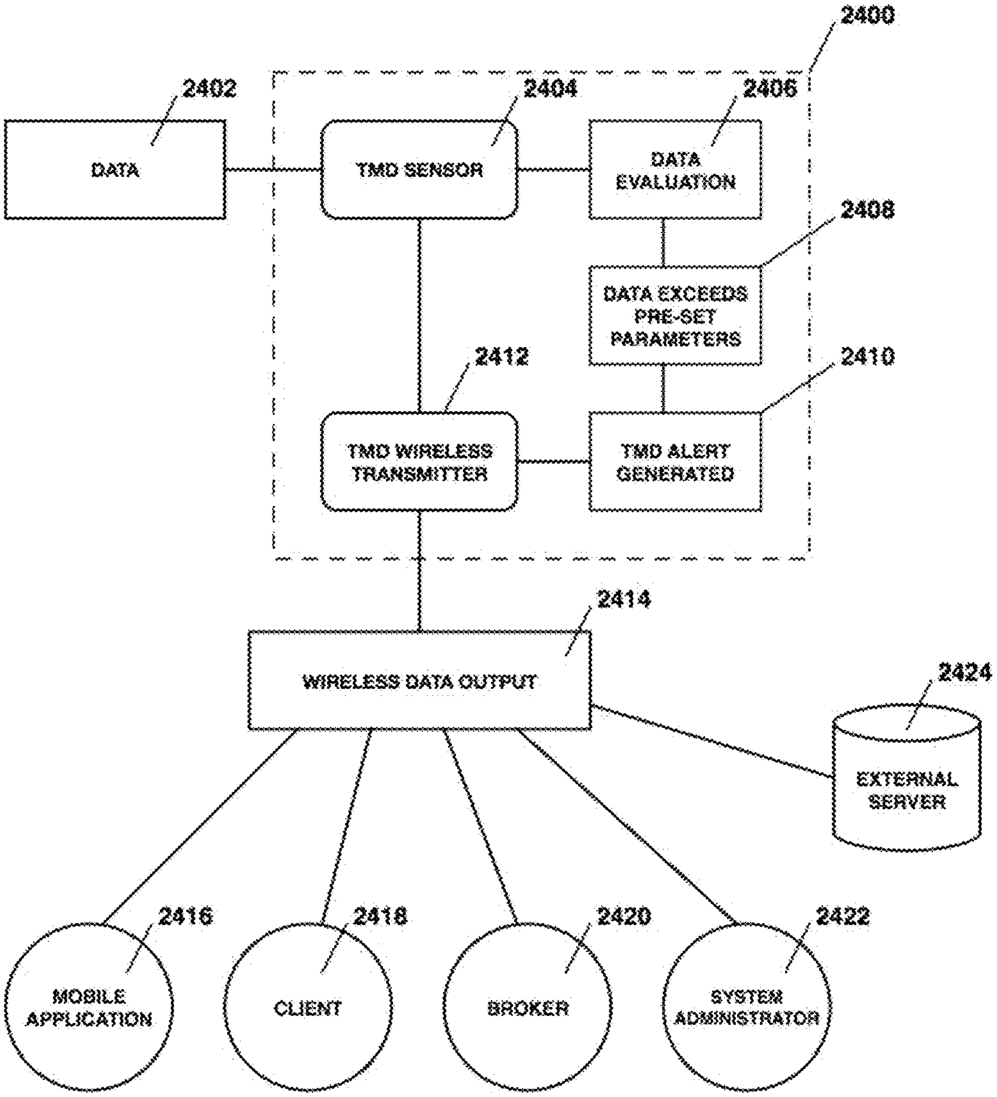
FIG. 24 is an overview of the data transmission pathways between the system server, the mobile application interface modules and the trailer monitoring device.

FIG. 24 is an overview of the data transmission pathways between the system server, the mobile application interface modules and the trailer monitoring device ("TMD"). In accordance with the preferred embodiment of the present invention, the TMD 2400 uses a multitude of customizable internal sensors 1004 that collect external data 1002 and evaluate the external data 2406 based on configured sensor parameters. If the external data is determined to exceed the pre-set parameters 2408, an alert is generated 2410 and wirelessly transmitted 2412 as data 2414 that is received and stored on several data collection platforms of the preferred embodiment. An example of one of these platforms is the mobile application 2416, whereby the driver is notified and can respond to the alert in real time. The client 2418 and the broker 2420 also have configured applications that are accessed online through secure user login data. The system administrator 2422 functions as the central system of the present invention, with the administrator moderating data received from the TMD as well as providing driver, client or customer assistance. All transmitted data is logged and stored on the secure external server 2424.

Figure 25:
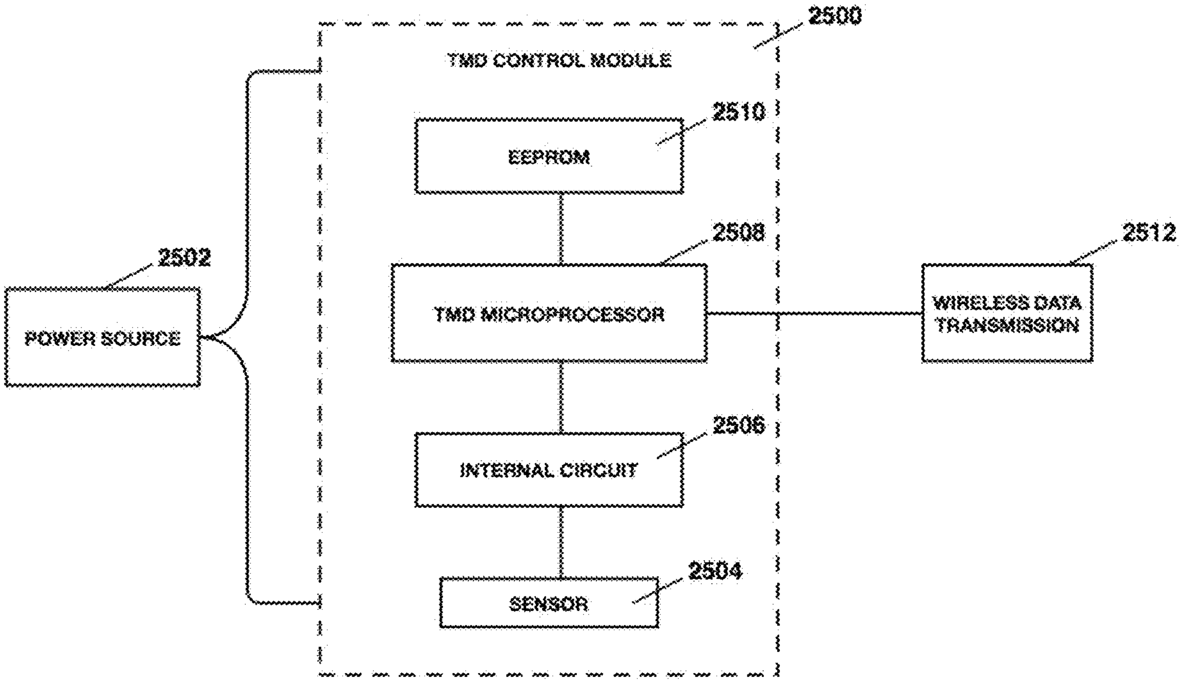
FIG. 25 is a block diagram overview of the trailer monitoring device connected to the internal trailer power source and the overall TMD control module and wireless data transmission capability of the device.

FIG. 25 is a block diagram overview of the trailer monitoring device connected to the internal trailer power source and the overall TMD control module and wireless data transmission capability of the device. In accordance with the preferred embodiment of the present invention. The TMD Control Module 2500 has four key internal components that can detect changes and send out a wireless transmission when supplied with a power source 2502 externally or with a connected rechargeable battery. The sensor 2504 is the first step of the internal TMD process, measuring the internal conditions of the trailer, monitoring the cargo's environment through data collection. The data collected by the sensor is then sent to the internal circuit of the TMD 2506, whereby that data is then routed to the TMD Microprocessor 2508 to be processed and reviewed. The TMD microprocessor can evaluate the data by comparing it to the stored parameters in the Electrical Erasable Programmable Read Only Memory ("EEPROM") 2510. If the data exceeds the set parameters stored in the EEPROM, the TMD Microprocessor generates an alert sent out as a wireless data transmission 2512 signal to the driver's mobile application and the central system server.

Figure 26:
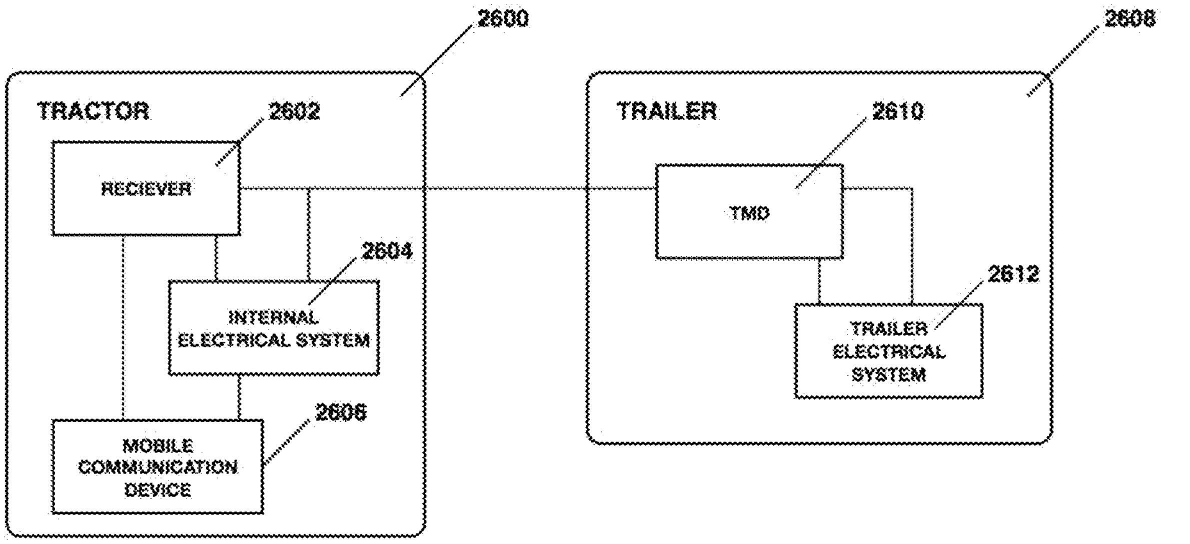
FIG. 26 is an overview of trailer power supply as controlled by the tractor, and how the tractor power supply connects to the driver's mobile application and the trailer monitoring device.

FIG. 26 is an overview of trailer power supply as controlled by the tractor, and how the tractor power supply connects to the driver's mobile application and the trailer monitoring device. In accordance with the preferred embodiment of the present invention, the trailer monitoring device ("TMD") is connected 2610 to the Trailer Electrical System 2612. The TMD 2610 wirelessly transmits all sensor data to the receiver 2602, located within the tractor 2600 and connected to the tractor internal electrical system 2604. The tractor receiver 2602 communicates with the driver's mobile device 2606, which may also be connected to the internal electrical system 2604 that serves as a power source for the device.

Although the disclosed technology is described above in terms of various exemplary embodiments and implementations, it should be understood that the various features, aspects, and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "an" or "a" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and can further be distributed in multiple groupings or packages or across multiple locations.

Additionally, the various embodiments set forth herein are described in terms of exemplary block diagrams, flow charts, and other illustrations. As will become apparent to one of ordinary skill in the art after reading this document, the illustrated embodiments, and their various alternatives may be implemented without confinement to the illustrated examples. For example, block diagrams and their accompanying description should not be construed as mandating a particular architecture or configuration.

Embodiments presented are particular ways to realize the invention and are not inclusive of all ways possible. Therefore, there may exist embodiments that do not deviate from the spirit and scope of this disclosure as set forth by appended claims but do not appear here as specific examples. It will be appreciated that a great plurality of alternative versions is possible.

What is claimed is:

1. A method of transmitting data from a vehicle corresponding with an associated trailer via a smartphone operated by a driver of said vehicle, the method comprising steps of:

- inputting into said smartphone a plurality of load parameters, including a geographic loading point, a geographic unloading point, and a load identification parameter;
- using said smartphone to collect an image of a storage area of said trailer after cleanliness of said storage area has been verified by said driver;
- using said smartphone to collect said image of an exterior of said trailer and a lock associated with said trailer which functions to secure a load contained within said storage area; and
- said smartphone communicating to a host transportation database said plurality of load parameters demonstrating a geographic position and condition of said load over a range of a plurality of geographic positions and time intervals commencing from a loading event through an unloading event; and
- said smartphone further comprising of a clock feature which facilitates additional auditing functions for said lock associated with said trailer;
- wherein said clock feature enables identification of dates and times of successful and unsuccessful unlocking attempts, and unlock attempts by specific users.

2. The method of claim 1, further comprising of said host transportation database receiving load data from a near-field communication device associated with said trailer via said smartphone.

3. The method of claim 1, wherein a route itinerary is provided to said driver pertaining to said load contained and associated within said trailer.

4. The method of claim 1, wherein said plurality of load parameters are monitored by a compliance monitoring system on an application interface on said smartphone operated by said driver.

5. The method of claim 1, further comprising of trailer asset monitoring system for said load, and wherein said image collected is utilized by said trailer asset monitoring system to evaluate conditions of said storage area.

6. A system for transmitting data from a vehicle corresponding with an associated trailer via a smartphone operated by a driver of said vehicle, the system comprising of a trailer monitoring device, configured to a microprocessor with near-field communication capabilities, capable of executing an instruction to:

- receive plurality of load parameters, including a geographic loading point, a geographic unloading point, and a load identification parameter from said smartphone operated by said driver of said vehicle corresponding with said trailer;
- using a camera associated with said smartphone to collect an image of a storage area of said trailer after cleanliness of said storage area has been verified by said driver;
- using said smartphone to collect and transmit said image of an exterior of said trailer and a lock associated with said trailer which functions to secure a load contained within said storage area;
- communicating, to host transportation database, said plurality of load parameters demonstrating a geographic position and condition of said load over a range of a plurality of geographic positions and time intervals commencing from a loading event through an unloading event with said smartphone; and
- said smartphone further comprising of a clock feature which is used to facilitate additional auditing functions for said lock associated with said trailer;
- wherein said clock feature enables identification of dates and times of successful and unsuccessful unlocking attempts and unlock attempts by specific users.

7. The system of claim 6, further comprising of said host transportation database receiving load data from a near-field communication device associated with said trailer via said smartphone.

8. The method of claim 6, wherein a route itinerary is provided to said driver pertaining to said load contained and associated within said trailer.

9. The method of claim 6, wherein said plurality of load parameters are monitored by a compliance monitoring system on an application interface on said smartphone operated by said driver.

10. The method of claim 6, further comprising of trailer asset monitoring system for said load, and wherein said image collected is utilized by said trailer asset monitoring system to evaluate conditions of said storage area.

11. A system for transmitting data from a vehicle corresponding with an associated trailer via a smartphone operated by a driver of said vehicle, the system comprising of a trailer monitoring device, configured to a microprocessor with near-field communication capabilities, capable of executing an instruction to:

- receive plurality of load parameters, including a geographic loading point, a geographic unloading point, and a load identification parameter from said smartphone operated by said driver of said vehicle corresponding with said trailer through a secure application interface;
- using a camera associated with said smartphone to collect an image of a storage area of said trailer after cleanliness of said storage area has been verified by said driver and compliance has been confirmed by personnel from a load host and a host transportation database;
- referencing a compliance monitoring system to ensure said storage area has met compliance standards according to a host and said driver;

using said smartphone to collect and transmit said image of an exterior of said trailer and a lock associated with said trailer which functions to secure a load contained within said storage area;

storing data pertaining to lock and unlock activity of said lock associated with said trailer to a secure, external application server; and communicating, to said host transportation database, said plurality of load parameters demonstrating a geographic position and condition of said load over a range of a plurality of geographic positions and time intervals commencing from a loading event through an unloading event with said smartphone;

wherein a clock feature which facilitates additional auditing functions for said lock associated with said trailer; and wherein the clock feature enables identification of dates and times of successful and unsuccessful unlocking attempts and unlock attempts by specific users to said secure, external application server.

12. The system of claim 11, further comprising of trailer asset monitoring system for said load, and wherein said image collected is utilized by said trailer asset monitoring system to evaluate conditions of said storage area.

13. The system of claim 11, wherein said host transportation database additionally receives load data deriving from said near-field communication capabilities associated with said trailer via said smartphone.

14. The system of claim 11, further comprising of said secure, external application server aggregating said data for said host transportation database.

15. The system of claim 11, wherein said secure application interface on said smartphone operated by said driver provides a contact book listing drivers and host transportation personnel for reference.

* * * * *